(12) United States Patent
Akinapelli et al.

(10) Patent No.: US 11,609,794 B2
(45) Date of Patent: Mar. 21, 2023

(54) TECHNIQUES FOR MODIFYING CLUSTER COMPUTING ENVIRONMENTS

(71) Applicant: Oracle International Corporation, Redwood Shores, CA (US)

(72) Inventors: Sandeep Akinapelli, Fremont, CA (US); Devaraj Das, Fremont, CA (US); Devarajulu Kavali, Santa Clara, CA (US); Puneet Jaiswal, Milpitas, CA (US); Velimir Radanovic, Half Moon Bay, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 37 days.

(21) Appl. No.: 17/094,715

(22) Filed: Nov. 10, 2020

(65) Prior Publication Data
US 2022/0147390 A1    May 12, 2022

(51) Int. Cl.
*G06F 15/16*    (2006.01)
*G06F 9/54*    (2006.01)
(Continued)

(52) U.S. Cl.
CPC .......... *G06F 9/505* (2013.01); *G06F 11/3433* (2013.01); *G06K 9/6256* (2013.01); *G06N 20/00* (2019.01); *H04L 67/1059* (2013.01)

(58) Field of Classification Search
CPC ..... G06F 9/505; G06F 11/3433; G06N 20/00; G06K 9/6256; H04L 67/1059
(Continued)

(56) References Cited

U.S. PATENT DOCUMENTS 8,260,840 B1    9/2012   Sirota et al.
10,185,713 B1 *    1/2019   Denkowski ............. G06F 40/51
(Continued)

FOREIGN PATENT DOCUMENTS

CN    110046048 A    7/2019
WO    2019104052 A1    5/2019

OTHER PUBLICATIONS

Barr, New—Predictive Scaling for EC2, Powered by Machine Learning, AWS News Blog, Nov. 20, 2018, https://aws.amazon.com/blogs/aws/new-predictive-scaling-for-ec2-powered-by-machine-learning/, retrieved on Nov. 17, 2020, 12 pages.
(Continued)

*Primary Examiner* — Hamza N Algibhah
(74) *Attorney, Agent, or Firm* — Kilpatrick Townsend & Stockton LLP

(57) ABSTRACT

Systems, devices, and methods discussed herein are directed to intelligently adjusting the set of worker nodes within a computing cluster. By way of example, a computing device (or service) may monitor performance metrics of a set of worker nodes of a computing cluster. When a performance metric is detected that is below a performance threshold, the computing device may perform a first adjustment (e.g., an increase or decrease) to the number of nodes in the cluster. Training data may be obtained based at least in part on the first adjustment and utilized with supervised learning techniques to train a machine-learning model to predict future performance changes in the cluster. Subsequent performance metrics and/or cluster metadata may be provided to the machine-learning model to obtain output indicating a predicted performance change. An additional adjustment to the number of worker nodes may be performed based at least in part on the output.

20 Claims, 11 Drawing Sheets

(51) Int. Cl.
*H04L 29/06* (2006.01)
*G06F 9/50* (2006.01)
*G06N 20/00* (2019.01)
*G06F 11/34* (2006.01)
*G06K 9/62* (2022.01)
*H04L 67/104* (2022.01)

(58) Field of Classification Search
USPC ........................................................ 709/226
See application file for complete search history.

(56) References Cited

U.S. PATENT DOCUMENTS

| | | | | |
|---|---|---|---|---|
| 10,743,036 B1 * | 8/2020 | Farris | ................... | H04N 21/251 |
| 2016/0094401 A1 | 3/2016 | Anwar et al. | | |
| 2016/0323377 A1 | 11/2016 | Einkauf et al. | | |
| 2018/0060744 A1 | 3/2018 | Achin et al. | | |
| 2018/0157521 A1 * | 6/2018 | Arikatla | ............... | G06F 9/45558 |
| 2019/0164080 A1 * | 5/2019 | Stefani | ...................... | G06N 3/02 |
| 2019/0244102 A1 * | 8/2019 | Harvey | ................ | G06K 9/6256 |
| 2020/0125389 A1 * | 4/2020 | Palermo | ............. | G06F 9/45558 |
| 2020/0142753 A1 * | 5/2020 | Harwood | .................. | G06F 9/52 |
| 2020/0171382 A1 | 6/2020 | Agoston | | |
| 2020/0285503 A1 | 9/2020 | Dou et al. | | |
| 2021/0192279 A1 * | 6/2021 | Laaksonen | ............ | G06F 9/5077 |
| 2021/0208545 A1 * | 7/2021 | Zhang | ...................... | G06N 5/04 |
| 2022/0035672 A1 * | 2/2022 | Vinod | ...................... | G06N 20/00 |
| 2022/0058511 A1 * | 2/2022 | McCusker | ............. | G06N 20/00 |
| 2022/0058512 A1 * | 2/2022 | Noorizadeh | ............. | G06N 5/04 |

OTHER PUBLICATIONS

International Application No. PCT/US2021/056659, International Search Report and Written Opinion dated Feb. 7, 2022, 13 pages.

* cited by examiner

TECHNIQUES FOR MODIFYING CLUSTER COMPUTING ENVIRONMENTS

BACKGROUND

Distributed computing systems have become increasingly common. These systems may include a computing cluster of connected nodes (e.g., computers, servers, virtual machines, etc.) that work together in a coordinated fashion to handle various requests (e.g., request to store and/or retrieve data in a system that maintains a database). As the number of tasks increases or decreases, the number of connected nodes may be suboptimal. For example, if the number of tasks decrease, the number of nodes may be greater than needed for the pending tasks, leaving some nodes idle. Conversely, if the number of tasks increase, the number of nodes may be less than what is needed to efficiently handle the pending tasks, thus introducing greater latency for performing the pending tasks. Improvements may be made to the manner by which conventional system manage the number of nodes of a computing cluster. Embodiments of the instant disclosure address these and other problems, individually and collectively.

BRIEF SUMMARY

Techniques are provided (e.g., a method, a system, non-transitory computer-readable medium storing code or instructions executable by one or more processors) for adjusting the number of nodes of a computing cluster in response to actual and/or predicted changes in one or more performance metrics of the computing cluster. Various embodiments are described herein, including methods, systems, non-transitory computer-readable storage media storing programs, code, or instructions executable by one or more processors, and the like.

One embodiment is directed to a method for adjusting the number of computing nodes in a computing cluster based at least in part on actual and/or predicted changes in one or more performance metrics of the computing cluster. The method may comprise monitoring, by a computing service, one or more performance metrics of a set of worker nodes of a computing cluster. The method may further comprise detecting, by the computing service, that a performance metric is below a performance threshold. The method may further comprise performing, by the computing service in response to detecting that the performance metric is below the performance threshold, a first adjustment to a number of worker nodes in the set of worker nodes of the computing cluster. The method may further comprise obtaining, by the computing service, training data for a machine-learning model based at least in part on performing the first adjustment. The method may further comprise training, by the computing service, the machine-learning model utilizing the training data and a supervised machine-learning algorithm. The method may further comprise obtaining, by the computing service, an output indicating a predicted performance change in the computing cluster. In some embodiments, the output is obtained based at least in part on providing one or more subsequent performance metrics of the computing cluster to the machine-learning model as input. The method may further comprise performing, by the computing service, a second adjustment to the set of worker nodes based at least in part on the output indicating the predicted performance change in the computing cluster.

In some embodiments, adjusting the set of worker nodes further comprises generating, by the computing service, a scaling task, wherein the scaling task is executed by a computing process, the computing process updating metadata associated with the computing cluster upon completion of the scaling task.

In some embodiments, the output indicating the predicted performance change indicates how many worker nodes will be utilized for computing tasks at a subsequent time, the subsequent time occurring within a predefined period of time in the future.

In some embodiments, performing the first adjustment or performing the second adjustment comprises increasing the quantity of the set of worker nodes or decreasing the quantity of the set of worker nodes.

In some embodiments, performing the first adjustment comprises provisioning a number of additional worker nodes to the set of worker nodes of the computing cluster. In some embodiments, the method may further comprise determining that provisioning the number of additional worker nodes has resulted in a subsequent performance metric that exceeds the performance threshold, wherein the training data is generated in response to determining the number of additional worker nodes has resulted in the subsequent performance metric.

In some embodiments, the training data comprises the one or more performance metrics, the subsequent performance metric, and the number of additional worker nodes provisioned during the first period of time. In some embodiments, the one or more performance metrics comprise at least one of: a number of pending queries, a number of pending tasks, a latency measurement, processing utilization, or memory utilization.

Another embodiment is directed to a computing device. The computing device may comprise a computer-readable medium storing non-transitory computer-executable program instructions. The computing device may further comprise a processing device communicatively coupled to the computer-readable medium for executing the non-transitory computer-executable program instructions. Executing the non-transitory computer-executable program instructions with the processing device causes the computing device to perform operations. These operations may comprise monitoring one or more performance metrics of a set of worker nodes of a computing cluster. In some embodiments, at least one of these metrics may be measured and/or collected by a worker node, although the metrics (e.g., a throughput metric) relate to an external service or computing device (e.g., an object storage service). The operations may further comprise that a performance metric is below a performance threshold. The operations may further comprise performing, in response to detecting that the performance metric is below the performance threshold, a first adjustment to a number of worker nodes in the set of worker nodes of the computing cluster. The operations may further comprise obtaining training data for a machine-learning model based at least in part on performing the first adjustment. The operations may further comprise training the machine-learning model utilizing the training data and a supervised machine-learning algorithm. The operations may further comprise obtaining an output indicating a predicted performance change in the computing cluster. In some embodiments, the output is obtained based at least in part on providing one or more subsequent performance metrics of the computing cluster to the machine-learning model as input. The operations may further comprise performing a second adjustment to the set of worker nodes based at least in part on the output indicating the predicted performance change in the computing cluster.

Yet another embodiment is directed to a non-transitory computer-readable storage medium storing computer-executable program instructions that, when executed by a processing device of a computing device, cause the computing device to perform operations. These operations may comprise monitoring one or more performance metrics of a set of worker nodes of a computing cluster. The operations may further comprise that a performance metric is below a performance threshold. The operations may further comprise performing, in response to detecting that the performance metric is below the performance threshold, a first adjustment to a number of worker nodes in the set of worker nodes of the computing cluster. The operations may further comprise obtaining training data for a machine-learning model based at least in part on performing the first adjustment. The operations may further comprise training the machine-learning model utilizing the training data and a supervised machine-learning algorithm. The operations may further comprise obtaining an output indicating a predicted performance change in the computing cluster. In some embodiments, the output is obtained based at least in part on providing one or more subsequent performance metrics of the computing cluster to the machine-learning model as input. The operations may further comprise performing a second adjustment to the set of worker nodes based at least in part on the output indicating the predicted performance change in the computing cluster.

The foregoing, together with other features and embodiments will become more apparent upon referring to the following specification, claims, and accompanying drawings.

BRIEF DESCRIPTION OF THE DRAWINGS

Various embodiments in accordance with the present disclosure will be described with reference to the drawings, in which.

DETAILED DESCRIPTION

Figure 1:
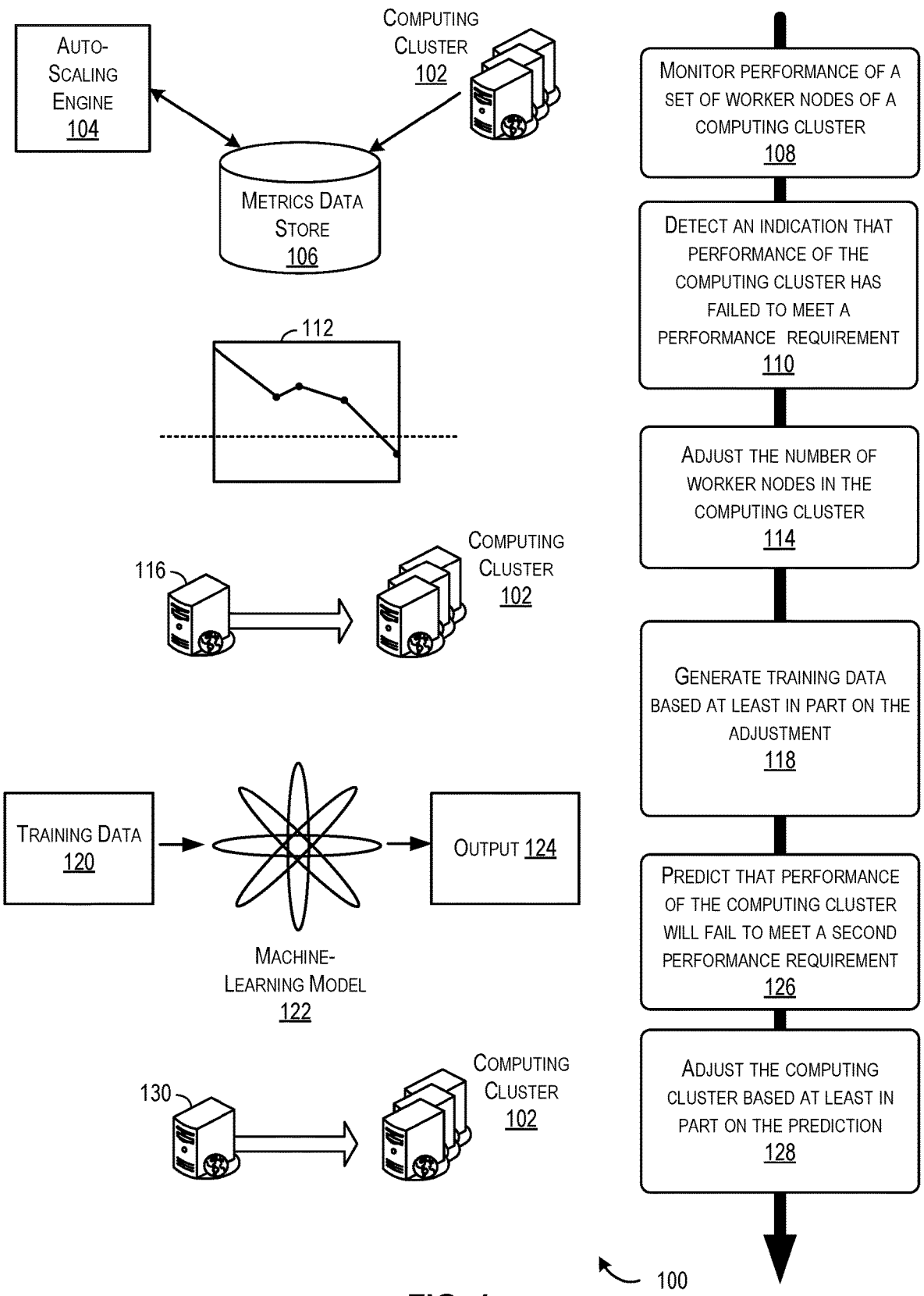
FIG. 1 illustrates a flow for adjusting a number of nodes in a computing cluster based at least in part on actual and/or predicted changes in performance of the computing cluster, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to a system and techniques for adjusting the number of computing nodes in a computing cluster based at least in part on actual and/or predicted changes in cluster performance. A "computing cluster" may include any suitable number of nodes that perform operations in a coordinated fashion. In some embodiments, the computing cluster may be provided in a cloud computing environment. As used herein, a "computing node" (also referred to as "worker nodes" and/or "nodes") may include a server, a computing device, a virtual machine, or any suitable physical or virtual computing resource configured to perform operations as part of a computing cluster. By way of example, a computing cluster may include one or more master nodes and one or more worker nodes, both being examples of a computing nodes. In some embodiments, a master node performs any suitable operations related to task assignment corresponding to one or more worker nodes, load balancing, node provisioning, node removal, or any suitable operations corresponding to managing the computing cluster. A worker node is configured to perform operations corresponding to tasks assigned to it by one or more master nodes. As a non-limiting example, a worker node can perform data storage and/or data retrieval tasks associated with a database at the behest of a master node that assigns the worker node a particular storage/retrieval task.

In some embodiments, an auto-scaling engine (e.g., operating on a manager node or computing device of a computing cluster) may monitor performance of a computing cluster with respect to one or more performance metrics and/or performance thresholds. By way of example, each computing node in the computing cluster may be configured to perform operations to report one or more performance metrics (e.g., a number of pending queries, a number of pending tasks, a latency measurement, processing utilization, memory utilization, etc.). These performance metrics can be collected and stored in a centralized data store accessible to the auto-scaling engine. The auto-scaling engine may monitor these performance metrics to identify when the performance of the computing cluster fails to meet a performance requirement (e.g., a performance metric falls below or exceeds one or more predefined performance thresholds). In response to detecting this scenario, the auto-scaling engine may adjust the number of computing nodes in the cluster. As a non-limiting example, if the performance metric indicates a latency of the system has exceeded a predefined performance requirement (e.g., a predefined performance requirement related to latency of task completion), the auto-scaling engine may perform operations to increase the number of computing nodes in the cluster in an effort to decrease the latency associated with task execution. As another example, if the performance metric indicates the number of idle computing nodes exceeds a predefined threshold (e.g., 1, 3, 4, 20, etc.), the auto-scaling engine may perform operations to reduce the number of computing nodes in the cluster.

Initially, the adjustments to the cluster due to the cluster's actual performance may be made in accordance with a predefined scheme. By way of example, the system may be configured to increase or decrease the number of computing nodes in the cluster by a predefined default amount (e.g., 1, 5, 10, etc.) depending on the manner by which the cluster's actual performance fails a performance requirement (e.g., as identified from one or more performance metrics provided by any suitable number of computing nodes of the cluster). After an adjustment has been made (e.g., an increase is made), the performance metrics of the computing nodes may be monitored to identify changes in performance. If the adjustment results in performance of the cluster degrading even further (e.g., latency increasing), the auto-scaling engine may attempt another adjustment (e.g., a converse adjustment such as decreasing the number of computing nodes) to improve the performance of the cluster. If the adjust results in the performance of the cluster approaching the performance requirement, an additional adjustment of a similar nature (e.g., adding an additional set of nodes) may be performed. Once the auto-scaling engine detects the cluster is meeting the performance requirement (e.g., a latency metric is below a predefined latency threshold while a number of idle computing nodes is less than a predefined idle threshold), the auto-scaling engine may store any suitable data applicable to the time period between when the performance degradation was identified and when the performance degradation was rectified. Said another way, any performance metric(s) (e.g., latency metrics, a number of pending tasks, a number of active queries, etc.) and/or cluster metadata (e.g., number of manager nodes, number of worker nodes, central processing units of the worker/manager nodes, memory allocations of the worker/manager nodes, etc.) collected within a threshold time period before or after a degradation was detected, or an adjustment was made in response to the detected degradation, may be stored for subsequent use (e.g., as an instance of training data) with an indicator that indicates that the adjustments were successful or unsuccessful.

In some embodiments, the auto-scaling engine may be configured to train a machine-learning model using the training data collected and a supervised learning technique. A "machine-learning model," as used herein, is a mathematical function that maps inputs to outputs. In some embodiments, the machine-learning model may be generated based at least in part on utilizing a supervised learning algorithm with a training data set that includes example inputs with predetermined/labeled outputs. Utilizing previously-collected training data (e.g., training data collected in the manner discussed above) and a supervised learning algorithm (e.g., linear regression), a machine-learning model is trained to predict performance changes to the cluster. By way of example, using the training data collected above, the machine-learning model can be trained to take performance metrics and/or cluster metadata as input and identify how many executors (e.g., worker nodes) will be needed at a subsequent time (e.g., 15 minutes in the future).

The disclosed techniques provide improvements over conventional systems. For example, conventional systems may utilize a fixed schedule to control increases and decreases in a computing cluster (e.g., at 9 AM, increase computing cluster to x nodes, at 10 AM decrease computing cluster toy nodes, etc.). However, utilizing a scheduled does not allow for the cluster to react to actual or potential performance changes, and thus, the number of computing nodes may be suboptimal. As another example, some conventional systems increase the number of nodes in a computing cluster based on reacting to an incoming workload. However, as provisioning a node can take time (e.g., 10 minutes, 15 minutes, etc.), systems that change the computing cluster reactive to an incoming workload may still experience suboptimal performance while new computing nodes are being prepared. Additionally, conventional systems do not utilize the type of performance metrics utilized herein for identifying cluster performance. By way of example, the computing worker nodes disclosed herein may utilize a distributed data processing engine (e.g., Apache Spark®) to provide performance metrics from which cluster changes can be determined. By utilizing these metrics, the disclosed system and methods provide a more accurate assessment of both actual and predicted performance of a computing cluster than was previously attainable.

Moving on to FIG. 1, which illustrates a flow 100 for adjusting a number of nodes in a computing cluster based at least in part on actual and/or predicted changes in performance of the computing cluster, in accordance with at least one embodiment. Cloud-computing system 100 may include a cloud-computing environment including computing cluster 102. The operations of flow 100 may be performed by any suitable computing node of computing cluster 102. Computing cluster 102 may be a distributed system configured to perform operations in a coordinated fashion utilizing any suitable number of executors (e.g., execution engines operating on respective computing nodes, the execution engines being configured to perform operations corresponding to a task assigned to the node). The computing nodes of computing cluster 102 may individually be any suitable physical device or virtual computing resource such as a server computer, a desktop computer, a laptop computer, a tablet computer, a virtual machine, or the like. As a non-limiting example, the computing cluster 102 may be a cloud-computing environment that includes many compute instances operating respective virtual machines and/or computing devices.

Auto-scaling engine 104 may be configured to execute on any suitable computing node of the computing cluster 102 or as a service and/or device separate from the computing cluster 102. In some embodiments, the computing cluster 102 may include any suitable number of manager and/or worker nodes. A manager node may be configured to receive task requests (e.g., from client devices, not pictured) and to assign execution of the corresponding tasks to worker nodes of the computing cluster 102. Each worker node may operate an executor module (e.g., a software or hardware module such as the execution module 478 of FIG. 4) that is configured to perform operations in response to receiving task data from a manager node. In some embodiments, each worker node and/or manager node of the computing cluster 102 may be configured to execute a distributed data processing engine that causes each node to provide performance metrics indicating a current performance of each node and/or current performance of the computing cluster 102. In some embodiments, the nodes may provide these performance metrics directly to metrics data store 106, or the metrics may be collected by a data collector (e.g., one of the nodes of the computing cluster 102) and then stored by the data collector in the metrics data store 106. For illustrative purposes, it is assumed that the computing cluster 102 has provided metrics to the metric data store prior to the start of flow 100 and that metrics continue to be provided by the nodes of computing cluster 102 periodically during the flow of 100. By way of example, each node may be programmed to provide metrics according to a predefined periodicity, frequency, schedule, in response to metric changes, or at any suitable time.

The flow 100 may begin at 108, where the auto-scaling engine 104 monitors performance of the set of worker nodes of the computing cluster 102. By way of example, the auto-scaling engine 104 may retrieve (e.g., at any suitable time, according to a predefined schedule, periodicity, frequency, upon change, etc.) one or more performance metrics 112 from the metrics data store 106. The metrics may pertain to one or more worker nodes of the computing cluster 102 and/or the computing cluster 102 as a whole. By way of example, the one or more performance metrics may include any suitable combination of: a number of pending tasks (e.g., tasks waiting for execution), a number of pending queries (total number of queries (also referred to as task requests) that has no task currently executing or completed, an average/minimum/maximum of memory utilization of the physical memory of one or more worker nodes, a number of tasks completed in the last x minutes, a current number of executors (e.g., worker nodes), an average/minimum/maximum of central processing unit (CPU) utilization of the worker nodes across the available cores, an average task completion time, and the like. A table of example performance metrics is provided in connection with FIG. 5.

At 110, the auto-scaling engine 104 may detect an indication that performance of the computing cluster 102 has failed to meet a performance requirement (e.g., a performance metrics has exceeded or fallen below a performance threshold). As a non-limiting example, the auto-scaling engine 104 may be configured to identify, from the performance metrics, a current executor count (Ec), a current task completion rate (Tcr), and a number of pending tasks (Pt). In some embodiments, the auto-scaling engine 104 can determine a number of additional worker nodes needed to complete the remaining pending tasks (e.g., Ec=Pt/Tcr). The auto-scaling engine 104 may be configured with one or more performance thresholds and one or more rules for adjusting the computing cluster 102 depending on the current performance metrics and the one or more performance thresholds. In the ongoing example, if the number of additional worker nodes is greater than a predefined threshold (e.g., 0, 5, 7, etc.), the auto-scaling engine 104 may be configured to provision additional worker nodes to the computing cluster 102. In some embodiments, the number provisioned may be predefined by one or more rules of the rule set (e.g., add 5, add 10, etc.), or the number provisioned may be defined in the rule set as corresponding to a calculation (e.g., Ec=Pt/Tcr) to be performed by the auto-scaling engine 104. Thus, in the current example, the auto-scaling engine 104, in accordance with the rule set, may provision a default number of additional worker nodes, or potentially the specific number of additional worker nodes determined from the equation Ec=Pt/Tcr. In some embodiments, a specific number of additional worker nodes may be determined with the equation Ec=w×(Pt/Tcr), where w is a fixed or dynamic weight value.

As another non-limiting example, the rule set may specific that if the average completion time of a task exceeds a predefined latency threshold, a fixed number of worker nodes (e.g., 2, 5, 10, etc.), or a number of working nodes computed using a predefined formula, are to be added to the computing cluster 102. As yet another non-limiting example, the rule set may specify that if a number of pending tasks, CPU utilization of the worker nodes, memory utilization of the worker nodes, and the like exceed respective predefined performance threshold (e.g., over ten pending tasks, over 90% CPU utilization and/or memory utilization, etc.) then a fixed number of worker nodes (e.g., 2, 5, 10, etc.), or a number of working nodes computed using a predefined formula, are to be added to the computing cluster 102. As yet another example, a rule set may specify that if a predetermined threshold is exceeded (e.g., a predefined latency threshold, a predefined CPU utilization threshold, etc.) a parallel computing cluster may be generated with a predefined number of nodes. A parallel computing cluster may execute separately from the original computing cluster and at least some portion of the tasks assigned to the original computing cluster may be transfer to the parallel computing cluster. In some embodiments, any suitable number of computing clusters may be generated in this manner. It should be appreciated that the particular rules of the rule set identifying particular operations to be performed in response to particular stimuli may vary in number and complexity.

At 114, the auto-scaling engine 104 may perform any suitable operations for adjusting the number of worker nodes in the computing cluster 102. By way of example, the auto-scaling engine 104 may spawn a separate process to adjust the number of nodes of the computing cluster 102 (e.g., to add and/or remove a specific number of worker and/or manager nodes). In some embodiments, the auto-scaling engine 104 may execute the process immediately or add the process to a pending queue for later execution. The process may be configured to perform any suitable operations to provision (e.g., add) one or more additional nodes of the computing cluster 102 (e.g., worker and/or manager nodes), or remove one or more nodes of the computing cluster 102, as instructed by the auto-scaling engine 104. As a non-limiting example, the process may execute operations to add worker node 116 to the computing cluster 102.

At 118, the auto-scaling engine 104 may be configured to generate training data based at least in part on the adjustment performed at 114. By way of example, the auto-scaling engine 104 may collect one or more performance metrics (also referred to as "cluster metadata")) originating within a period of time before the adjustment was made, as the adjustment is made, and/or within some period of time after the adjust was made. In some embodiments, one or more performance metrics may be collected from a predefined period of time (e.g., 5 minutes, 2 minutes, etc.) before the adjustment was made and/or the one or performance metrics may be collected based at least in part on a first occurrence in which the computing cluster 102 failed to meet a particular performance threshold. Similarly, if one or more performance metrics are collected after the adjustment, the particular performance metrics may be collected based at least in part on a predefined period of time (e.g., 3 minutes, 6 minutes) after the adjustment was made and/or based at least in part on identifying a time at which the performance metrics of the computing cluster 102 indicated the performance degradation was rectified (e.g., the performance metrics indicate the computing cluster 102 was meeting the performance threshold after the adjustment was made). As a non-limiting example, performance metrics of the computing cluster 102 originating five minutes before the adjustment through a time at which the performance metrics indicated the original performance degradation (e.g., the latency exceeds a predefined threshold) was rectified (e.g., the latency met or fell below the predefined threshold)

and/or for a predefined period of time after the adjustment was complete (e.g., 5 minutes after the computing nodes were added/removed).

In some embodiments, the auto-scaling engine 104 may generate a training data set example that includes the collected metrics, the number of computing nodes added/removed, and a label indicating whether the adjustment rectified the performance degradation (e.g., successful/unsuccessful). The training data set example may be added to a training data set (e.g., training data set 120) stored in memory that will be subsequently used to train a machine-learning model (e.g., machine-learning model 122) to identify adjustments to be made to the computing cluster 102 (e.g., output 124) based at least in part on predicting performance metrics of a future time (e.g., how many computing nodes will be needed 15 minutes in the future). The machine-learning model 122 may be trained based at least in part on the flow 200 described in connection to FIG. 2.

At 126, the auto-scaling engine 104 may predict that performance of the computing cluster 102 will fail to meet a second performance requirement. By way of example, the auto-scaling engine 104 may collect current performance metrics and provide these metrics to the machine-learning model 122 as input. The machine-learning model 122 may generate output 124 that indicates whether a change to the computing cluster 102 is needed. In some embodiments, the output 124 may indicate one or more performance requirements for which degradation is predicted (e.g., the latency in 15 minutes will exceed the predefined latency threshold, the pending number of tasks will exceed a predefined threshold) and/or a number of computing nodes (worker and/or manager nodes) needed to process the predicted pending tasks (e.g., the number of pending tasks predicted to exist 15 minutes in the future), and/or a number of nodes (worker and/or manager nodes) to be added and/or removed from the computing cluster 102. If a number of computing nodes needed to process the predicted pending tasks is provided, the auto-scaling engine 104 may be configured to compare this number to a current number of nodes of the computing cluster 102 to determine how many more or fewer computing nodes are needed.

At 128, the auto-scaling engine 104 may adjust the computing cluster 102 based at least in part on the prediction provided by the machine-learning model 122 (e.g., output 124). By way of example, the auto-scaling engine 104 may spawn a separate process to adjust the number of nodes of the computing cluster 102 (e.g., to add and/or remove a specific number of worker and/or manager nodes) based at least in part on output 124 (e.g., output indicating an additional worker node is needed). In some embodiments, the auto-scaling engine 104 may execute the process immediately or add the process to a pending queue for later execution. The process may be configured to perform any suitable operations to provision (e.g., add) one or more additional nodes of the computing cluster 102 (e.g., worker and/or manager nodes), or remove one or more nodes of the computing cluster 102, as instructed by the auto-scaling engine 104. As a non-limiting example, the process may execute operations to add worker node 130 to the computing cluster 102.

Figure 2:
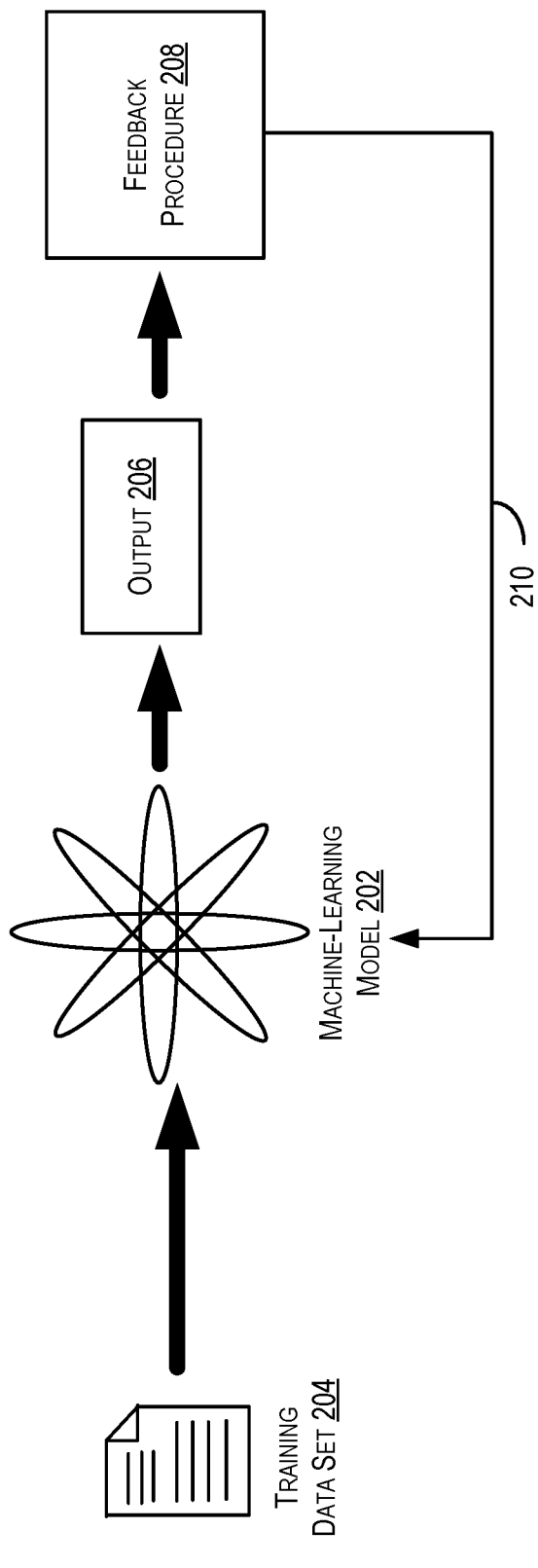
FIG. 2 illustrates a flow for training a machine-learning model to predict changes in the performance of a computing cluster, in accordance with at least one embodiment.

FIG. 2 illustrates a flow 200 for training a machine-learning model to predict changes in the performance of a computing cluster, in accordance with at least one embodiment. In some embodiments, the operations of flow 200 may be performed by an auto-scaling engine discussed later with respect to FIGS. 4 and 5.

In some embodiments, the machine-learning model 202 may be configured to accept, as input, training data set 204. Training data set 204 may be obtained by the machine-learning model 202 from a data store (e.g., the metric data store 106 of FIG. 1). Training data set 204 (also referred to as a "training data set" or "training data") may include any suitable number of positive and/or negative examples. An example instance of the training data set may include performance metrics and/or cluster metadata collected within a threshold period of time of a cluster adjustment (e.g., a predefined time period before or after a cluster adjustment) and an indication as to whether or not the changes rectified a performance degradation. A positive example may be considered one in which the performance metrics and/or cluster metadata indicate a cluster adjustment that rectified a performance degradation while a negative example may be considered one in which the performance metrics and/or cluster metadata indicate a cluster adjustment that did not rectify a performance degradation Thus, the machine-learning model 202 may be trained with the training data set 204 to identify a particular adjustment to be made to a computing cluster based on current performance metrics and/or cluster metadata. In some embodiments, the operations of flow 200 may be performed any suitable number of times to train any suitable number of machine-learning models to detect respective cluster adjustments for differing computing clusters. By way of example, while the machine-learning model 202 may be trained to identify adjustments for a particular computing cluster based on that particular computing cluster's historical cluster changes.

Once trained, machine-learning model 202 may be utilized to generate output 206. In some embodiments, a portion (e.g., two-thirds) of training data set 204 may be utilized for training purposes, while another portion (e.g., the remaining one-third) of the training data set 204 may be utilized for verification. For example, the machine-learning model 202 may be trained using two-thirds of the examples of training data set 204. Once trained, each of the examples of the remaining third of the training data set 204 may be individually provided as input to the machine-learning model 202 to generate output 206 (e.g., individual instances of output corresponding to the respective inputs). The output 206 may be compared to the respective indicators of the training data set 204 to determine whether the machine-learning model 202 produced output that agreed with the respective indicators of the training data set (e.g., indicating the individual adjustment rectified or did not rectify a performance degradation). In some embodiments, the machine-learning model 202 may not be deployed until it produces output that exceeds a predefined accuracy threshold (e.g., 90% of the time or higher, the model produces an output that agrees with the respective indicators of the training data set 204). In some embodiments, additional training data set examples may be collected with which the machine-learning model 202 may be retrained until it exceeds the predefined accuracy threshold. Once the machine-learning model 202 produces output with sufficient accuracy, the machine-learning model 202 may be deployed to any suitable number of computing resources and utilized to make subsequent cluster adjustments.

As the machine-learning model 202 is utilized to determine cluster adjustments, the output 206 provided by the machine-learning model 202 may be utilized with feedback procedure 208 to improve the accuracy of the machine-learning model 202. In some embodiments, the feedback procedure 208 may include collecting data (e.g., performance metrics and/or cluster metadata) within a predefined period of time before or after an adjustment was made (e.g., an adjustment identified by the machine-learning model 202). The output 206 and the collected data may be analyzed utilizing a predefined rule set to determine whether the adjustment identified by the machine-learning model 202 (e.g., output 206) resulted in rectified a performance degradation. As another examples, any suitable portion of the output 206 and/or the collected data to one or more users and/or one or more remote systems (e.g., a cluster administrator device, crowdsource data collection systems, etc.). A user of the crowdsource system (e.g., a user experienced in cluster management) may provide input indicating whether the adjustment identified by the machine-learning model 202 (e.g., output 206) resulted in rectified a performance degradation of the computing cluster.

The feedback obtained through execution of the feedback procedure 208 (e.g., indicating whether the adjustment identified by the machine-learning model 202 (e.g., output 206) resulted in rectified a performance degradation of the computing cluster) may be provided to the machine-learning model 202 at 210 in order to improve the accuracy of the machine-learning model 202 by expanding the training data set with which machine-learning model 202 is eventually retrained. Thus, over time, the machine-learning model 202 may be become increasingly more accurate with respect to identifying adjustments to the computing cluster to rectify various performance degradations.

Figure 3:
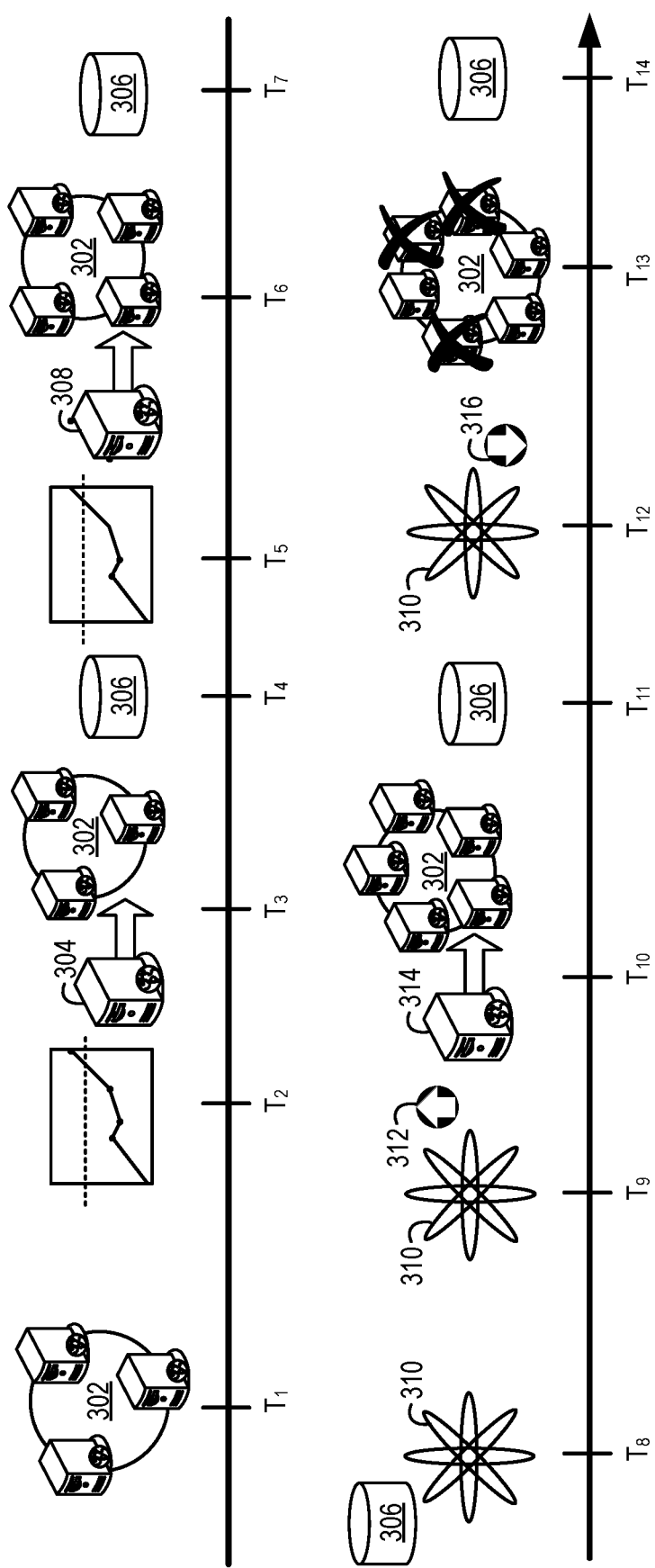
FIG. 3 illustrates a timeline for depicting an example use case for performing adjustments to a computing cluster, in accordance with at least one embodiment.

FIG. 3 illustrates a timeline 300 for depicting an example use case for performing adjustments to a computing cluster, in accordance with at least one embodiment. The operations described in connection with timeline 300 may be performed by the auto-scaling engine 104 of FIG. 1.

At time T1, computing cluster 302 may include any suitable number of computing nodes. By way of example, the computing cluster 302 may include one manager node and two worker nodes. Each of the nodes of the computing cluster 302 may provide one or more performance metrics indicating its current performance and/or performance of the computing cluster 302 as a whole. These performance metrics may be provided at any suitable time along timeline 300 according to a predefined schedule, periodicity, frequency, and/or based at least in part on changes to the performance metrics.

At time T2, the auto-scaling engine 104 may determine that the performance metrics indicate that a performance degradationdegradation has occurred (e.g., that a performance metric has exceeded or fallen below a predefined performance threshold). This determination may be in accordance with a predefined rule set with which the auto-scaling engine 104 is configured to access. As a non-limiting example, the auto-scaling engine 104 may determine at time T2 that a latency metric (e.g., average completion time of a task) exceeds a predefined latency threshold. In response to the determination made at time T2, the auto-scaling engine 104 may identify that an additional computing node (e.g., worker node 304) is to be provisioned and added to the computing cluster 302.

At time T3, the auto-scaling engine 104 may execute any suitable operations to provision worker node 304 and add worker node 304 to the computing cluster 302.

At time T4, the auto-scaling engine 104 may add one or more performance metrics corresponding to the adjustment to a training data set 306. By way of example, the auto-scaling engine 104 may generate a training data set example including performance metrics collected between time T2 and time T4 (e.g., a predefined period of time after the adjustment made at time T3, a time at which the auto-scaling engine 104 determines the performance degradation has been rectified, a time defined by a predefined scheduled, etc.) along with the number of nodes added/removed from the computing cluster (e.g., in this case, one), and a label that indicates whether the adjustment rectified the performance degradation. The auto-scaling engine 104 may then add the training data set example to the training data set 306.

At time T5, the auto-scaling engine 104 may determine that the performance metrics indicate that another performance degradation has occurred (e.g., that a performance metric has exceeded or fallen below a predefined performance threshold). This determination may once again be in accordance with a predefined rule set with which the auto-scaling engine 104 is configured to access. As a non-limiting example, the auto-scaling engine 104 may determine at time T5 that the latency metric once again exceeds a predefined latency threshold. In response to the determination made at time T2, the auto-scaling engine 104 may identify that an additional computing node (e.g., worker node 308) is to be provisioned and added to the computing cluster 302.

At time T6, the auto-scaling engine 104 may execute any suitable operations to provision worker node 308 and add worker node 308 to the computing cluster 302.

At time T7, the auto-scaling engine 104 may add one or more performance metrics corresponding to the adjustment made at time T6 to the training data set 306. By way of example, the auto-scaling engine 104 may generate a training data set example including performance metrics collected between time T5 and time T7 (e.g., a predefined period of time after the adjustment made at time T5, a time at which the auto-scaling engine 104 determines the performance degradation has been rectified, a time defined by a predefined scheduled, etc.) along with the number of nodes added/removed from the computing cluster (e.g., in this case, one), and a label that indicates whether the adjustment rectified the performance degradation. The auto-scaling engine 104 may then add the training data set example to the training data set 306.

At time T8, the auto-scaling engine 104 may execute any suitable supervised machine-learning algorithm with the training data set 306 to train machine-learning model 310. Machine-learning model 310 may be trained to identify subsequent adjustments to be made to the computing cluster based at least in part on input including a set of current performance metrics of the computing cluster 102.

At time T9, the auto-scaling engine 104 may provide a current set of performance metrics to the machine-learning model 310 as input. In response, the machine-learning model 310 may produce output 312 indicating an additional worker node is needed. This output 312 may be generated based at least in part on the machine-learning model 310 predicting that a performance metric degradation will occur in a subsequent period of time (e.g., the next 15 minutes), that x number of computing nodes (e.g., one) will be needed to avoid performance degradation in the subsequent period of time, etc.

At time T10, the auto-scaling engine 104 may execute any suitable operations to provision worker node 314 and add worker node 314 to the computing cluster 302.

At time T11, the auto-scaling engine 104 may add one or more performance metrics corresponding to the adjustment made at time T10 to the training data set 306. By way of example, the auto-scaling engine 104 may generate a training data set example including performance metrics collected between time T9 and time T11 (e.g., a predefined period of time after the adjustment made at time T10, a time at which the auto-scaling engine 104 determines the performance degradation has been avoided, a time defined by a predefined scheduled, etc.) along with the number of nodes added/removed from the computing cluster (e.g., in this case, one), and a label that indicates whether the adjustment was successful (e.g., whether the performance degradation was avoided). The auto-scaling engine 104 may then add the training data set example to the training data set 306.

At time T12, the auto-scaling engine 104 may provide a current set of performance metrics to the machine-learning model 310 as input. In response, the machine-learning model 310 may produce output 316 indicating some number (e.g., 3) worker nodes of the computing cluster 302 will become idle during a subsequent time period (e.g., the next 15 minutes). This output 316 may be generated based at least in part on the machine-learning model 310 predicting that a performance metric degradation will occur in a subsequent period of time (e.g., the next 15 minutes), that x number of computing nodes (e.g., one) should be removed to avoid performance degradation in the subsequent period of time (e.g., to avoid idle computing nodes), etc.

At time T13, the auto-scaling engine 104 may execute any suitable operations to remove one or more nodes (e.g., three worker nodes) from the computing cluster 302.

At time T14, the auto-scaling engine 104 may add one or more performance metrics corresponding to the adjustment made at time T13 to the training data set 306. By way of example, the auto-scaling engine 104 may generate a training data set example including performance metrics collected between time T12 and time T14 (e.g., a predefined period of time after the adjustment made at time T10, a time at which the auto-scaling engine 104 determines the performance degradation has been avoided, a time defined by a predefined scheduled, etc.) along with the number of nodes added/removed from the computing cluster (e.g., in this case, one), and a label that indicates whether the adjustment was successful (e.g., whether the performance degradation was avoided). The auto-scaling engine 104 may then add the training data set example to the training data set 306.

Figure 4:
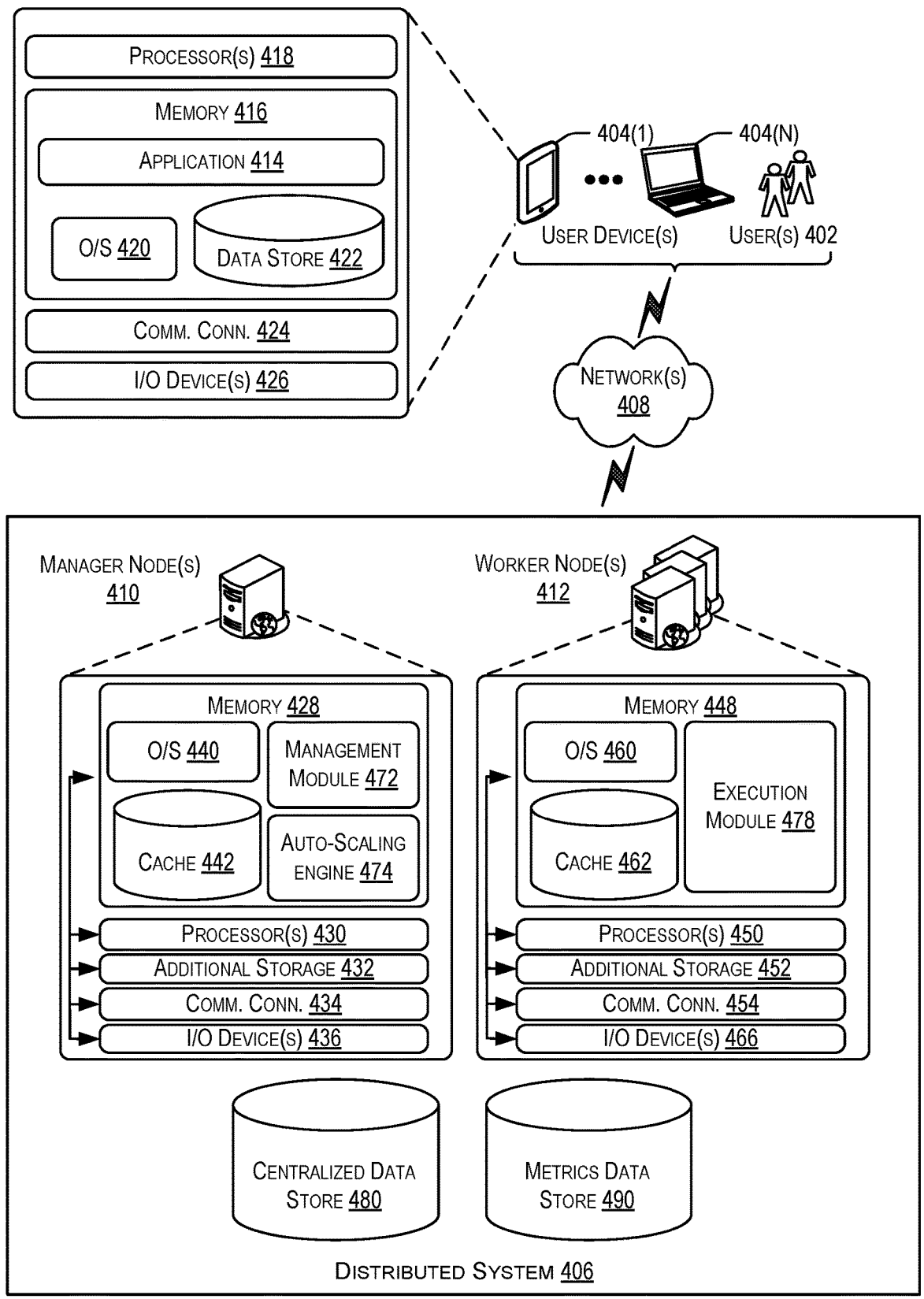
FIG. 4 illustrates components of a computing system, in accordance with at least one embodiment.

FIG. 4 illustrates components of a computing system 400, in accordance with at least one embodiment. In system 400, one or more user(s) 402 may utilize a user device (e.g., a user device of a collection of user device(s) 404 to provide various computing requests to distributed system 406 via network(s) 408. In some examples, the network(s) 408 may include any one or a combination of many different types of networks, such as cable networks, the Internet, wireless networks, cellular networks, and other private and/or public networks. Distributed system 406 (e.g., a computing cluster) may be an example of a computing cluster (e.g., the computing cluster 102 of FIG. 1). In some embodiments, distributed system 406 may include any suitable number of management nodes (e.g., manager node(s) 410) and any suitable number of worker nodes (e.g., worker node(s) 412), collectively referred to as "computing nodes" or "nodes" for brevity. For example, the user may access a user interface accessible through an application 414 running on the user device(s) 404. In some aspects, the application 414 operating on the user device(s) 404 may be hosted, managed, and/or provided by computing resources of the distributed system 406 (e.g., the manager node(s) 410 and/or separate computing resources of the distributed system 406 not depicted in FIG. 4).

In some embodiments, the application 414 may allow the user(s) 402 to interact with the distributed system 406. For example, a user may utilize interfaces provided by the application 414 to request data. The distributed system 406 may in turn be configured to process the request and return the requested data to the user device(s) 404 via application 414. The application 414 may further be configured to receive, process, and/or display the data provided by the distributed system 406.

The user device(s) 404 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 404 may be in communication with the distributed system 406 via the network(s) 408, or via other network connections.

In one illustrative configuration, the user device(s) 404 may include at least one memory 416 and one or more processing units (or processor(s)) 418. The processor(s) 418 may be implemented as appropriate in hardware, computer-executable instructions, firmware, or combinations thereof. Computer-executable instruction or firmware implementations of the processor(s) 418 may include computer-executable or machine-executable instructions written in any suitable programming language to perform the various functions described.

The memory 416 may store program instructions that are loadable and executable on the processor(s) 418, as well as data generated during the execution of these programs. Depending on the configuration and type of user computing device, the memory 416 may be volatile (such as random access memory (RAM)) and/or non-volatile (such as read-only memory (ROM), flash memory, etc.). The user device(s) 404 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 416 may include multiple different types of memory, such as static random access memory (SRAM), dynamic random access memory (DRAM), or ROM.

Turning to the contents of the memory 416 in more detail, the memory 416 may include an operating system 420, one or more data stores 422, and one or more application programs, modules, or services provided via the application 414 (e.g., a browser application, a video player application, etc.). The application 414 may be configured to receive, store, and/or display a network page or other interfaces for interacting with the distributed system 406. Additionally, the memory 416 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 404 may also contain communications connection(s) 418 that allow the user device(s) 404 to communicate with a stored database, another computing device or server (e.g., the distributed system 406), user terminals and/or other devices on the network(s) 408. The user device(s) 404 may also include I/O device(s) 420, such as a keyboard, a mouse, a pen, a voice input device, a touch input device, a display, speakers, a printer, etc.

In some aspects, the manager node(s) 410 and worker node(s) 412 (collectively referred to as "nodes") of distributed system 406 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the nodes of distributed system 406 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the nodes of distributed system 406 may be in communication with the user device(s) 404 via the network(s) 408 or via other network connections. The nodes of distributed system 406 may include one or more servers, perhaps arranged in a cluster, as a server farm, or as individual servers not associated with one another. These servers may be configured to implement the functionality described herein as part of an integrated, distributed computing environment.

In one illustrative configuration, the manager node(s) 410 and worker node(s) 412 may include at least one memory 428 and memory 448, respectively, and one or more processing units (or processor(s) 430 and 450, respectively). The processor(s) 430 and 450 may be implemented as appropriate in hardware, computer-executable instructions, firmware, or combinations thereof. Computer-executable instruction or firmware implementations of the processor(s) 430 and 450 may include computer-executable or machine-executable instructions written in any suitable programming language to perform the various functions described.

The memory 428 and the memory 448 may store program instructions that are loadable and executable on the processor(s) 430 and 450, respectively, as well as data generated during the execution of these programs. Depending on the configuration and type of the nodes, the memory 428 and the memory 448 may each be volatile (such as RAM) and/or non-volatile (such as ROM, flash memory, etc.). The manager node(s) 410 and worker node(s) 412 may individually include additional storage 432 and 452, respectively, which may include removable storage and/or non-removable storage. The additional storage 732 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 428 and the memory 448 may individually include multiple different types of memory, such as SRAM, DRAM, PMEM, NVME, or ROM.

The memory 428, the memory 448, the additional storage 432, the additional storage 452, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 428, the memory 448, the additional storage 432, the additional storage 452, centralized data store 480, and metrics data store 490 are all examples of computer storage media. Additional types of computer storage media that may be present in the nodes and/or data stores of the distributed system 406 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the distributed system 406. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The manager node(s) 410 and the worker node(s) 412 may also contain communications connection(s) 434 and 454, that allow the respective node to communicate with a stored database (e.g., centralized data store 480, metrics data store 490, etc.), another computing device or server, user terminals and/or other devices on the network(s) 408. The manager node(s) 410 and the worker node(s) 412 may also include I/O device(s) 436 and 456, respectively, which may be a keyboard, a mouse, a pen, a voice input device, a touch input device, a display, speakers, a printer, etc.

Turning to the contents of the memory 428 and memory 458 in more detail, the memory 428 and the memory 458 may include an operating system 440 and 460, respectively, one or more cache 442 and 462, respectively, and/or one or more application programs, modules, or services for implementing the features disclosed herein. By way of example, the memory 428 of the manager node(s) 410 may include management module 472 and auto-scaling engine 474 (e.g., an example of the auto-scaling engine 104 of FIG. 1). Although the management module 472 and auto-scaling engine 474 are depicted as separate modules, in some embodiments, the functionality of both may be provided by a single software and/or hardware module operating at the manager node(s) and/or operating, at least in part, on a different computing resource of the distributed system 406 (e.g., a computing device (not pictured) associated with the distributed system 406 and configured to perform any suitable combination of the functionality discussed herein with respect to FIGS. 1-3).

In some embodiments, the management module 472 is configured with software and/or hardware to perform operations associated with managing the worker node(s) 412. By way of example, the management module 472 may include instructions that, when executed by the processor(s) 430, cause the manager node(s) 410 to perform any suitable operations related to provisioning new nodes to a computing cluster (e.g., the computing cluster 102 of FIG. 1), removing nodes from a computing cluster, load balancing, task assignment, providing (e.g., to the metrics data store 490) one or more performance metrics of the manager node(s) 410, or any suitable operations related to managing the worker node(s) 412. In some embodiments, the management module 472 includes a distributed data processing engine (e.g., Apache Spark®) that provides various performance metrics from which cluster adjustments can be determined. In some embodiments, the auto-scaling engine 474 is configured to perform any suitable operations associated with determining when to increase and/or decrease a number of worker node(s) 412 based at least in part on actual and/or predicted performance metrics and cluster metadata. In some embodiments, the auto-scaling engine 474 may be configured to communicate with the management module 472, the metrics data store 490, the worker node(s) 412, or any suitable computing resource of the distributed system 406. The specific functionality provided by the auto-scaling engine 474 will be discussed in further detail with respect to FIG. 5.

In some embodiments, the execution module 478 performs any suitable operations for performing tasks assigned to the worker node(s) 412 by the manager node(s) 410. In some embodiments, the execution module 478 (also referred to herein as "an executor") may provide performance metrics associated with the worker node(s) 412. As a non-limiting example, the execution module 478 may include a distributed data processing engine (e.g., Apache Spark®) that provides various performance metrics from which cluster adjustments can be determined. By way of example, the execution module 478 may be configured to provide any suitable combination of one or more performance metrics according to any suitable predefined schedule, periodicity, frequency, upon changes occurring with respect to one or more performance metrics, and/or a set of rules for providing said performance metrics.

The following table lists some example performance metrics that may be provided by the management module 472, the auto-scaling engine 474, the execution module 478, or any suitable combination of the above.

| Metric Category | Metric Name | Example Source(s) | Remarks |
|---|---|---|---|
| Physical resources | numExecutors | Metric may be provided by Apache Spark ® and/or use data provided by Apache Spark ® | Number of executors currently active |
| | PendingTasks | Metric may be provided by Apache Spark ® and/or use data provided by Apache Spark ® | Total number of tasks that are waiting for execution |
| | ActiveTasks | Metric may be provided by Apache Spark ® and/or use data provided by Apache Spark ® | Total number of tasks currently running |
| | PendingQueries | Management Module(s) | Total number of queries that have no corresponding task currently executing or completed |
| | ActiveQueries | Management Module(s) | Total number of queries for which at least one task is executed or completed |
| | CompletedQueries | Management Module(s) | Total number of queries that finished executing in last x number of minutes |
| | CompletedTasks | Management Module(s) and/or Executor Module(s) | Total number of tasks that finished executing in last x number of minutes |
| | avgCompletionTime | Management Module(s) | Average runtime of queries that finished executing in the last x number of minutes. |
| Query | QueryComplexity | Metric may be provided by Apache Spark ® and/or use data provided by Apache Spark ® | This is a custom metric (e.g., calculated by the management module 472) which takes into account several aspects of the query including the number of joins, number of rows being processed, number of stages in the query, sizes of the underlying tables, etc.. The metric is computed across all the queries normalized over a scale of 1-100 |
| | NumIndexes | Management Module(s) | Indicates how many indexes used in the query |

-continued

| Metric Category | Metric Name | Example Source(s) | Remarks |
|---|---|---|---|
| | QueryType | Management Module(s) | Query, insert, partition-add etc.. |
| | DataAdded | Management Module(s) and/or Executor Module(s) | Amount of data added to tables from the queries that completed in between a metric collection cycle (e.g., time between the last metric collection and the second to last metric collection) |
| Cache | CachedBytes | Management Module(s) and/or Executor Module(s) | Amount of data that is cached across all worker nodes |
| | CacheCapactity | Management Module(s) and/or Executor Module(s) | Maximum capacity of the cache (e.g., the collective cache of all worker nodes) |
| | CachePropogationTime | Management Module(s) and/or Executor Module(s) | time taken to increase the cachedBytes by x megabytes. (when the cachedBytes is changed in two subsequent cycles). |
| | NumExecutosrWithCache | Management Module(s) and/or Executor Module(s) | Number of worker nodes that have at least 1 cache segment |
| | AverageCacheReplicaFactor | Management Module(s) and/or Executor Module(s) | Current replication status, taken as an average of the replication factor of all the segments. |
| Utilization | AvgExecutorMemoryUtilization | Management Module(s) and/or Executor Module(s) | Average % utilization of the physical memory of the worker nodes |
| | MinExecutorMemoryUtilization | Management Module(s) and/or Executor Module(s) | Minimum % utilization of the physical memory of the worker nodes |
| | MaxExecutorMemoryUtilization | Management Module(s) and/or Executor Module(s) | Maximum % utilization of the physical memory of the worker nodes |
| | AvgExecutorCPUUtilization | Management Module(s) and/or Executor Module(s) | Average % utilization of the CPU of the worker nodes across the available cores |
| | MinExecutorCPUUtilization | Management Module(s) and/or Executor Module(s) | Minimum % utilization of the CPU of the worker nodes across the available cores |
| | MaxExecutorCPUUtilization | Management Module(s) and/or Executor Module(s) | Maximum % utilization of the CPU of the worker nodes across the available cores |

-continued

| Metric Category | Metric Name | Example Source(s) | Remarks |
| --- | --- | --- | --- |
| | ObjectStoreThroughput | Management Module(s) and/or Executor Module(s) | The throughput that is recorded in that past x minutes in terms of amount data/sec from object store to worker nodes. |
| Time | Time | Management Module(s) and/or Executor Module(s) | The timestamp when the metrics were collected. |
| Seasonality | isHolidayWeek. | Management Module(s) and/or Executor Module(s) | Metrics to indicate important events such as holidays. |
| Financial calendar | Quarter End Date, Quarter begin date, FY-beginDate, FY-EndDate, | Management Module(s) and/or Executor Module(s) | Different dates to indicate the potential query floods |
| | Data skew of the queries | Management Module(s) and/or Executor Module(s) | This is a derived metric that is computed based on the data skew of the different completed tasks, normalized to a scale of −10.0 to 10.0 |
| | X-days Indicators | Management Module(s) and/or Executor Module(s) | These are the set of derived indicator metrics that tells you if you are x number of days before/after the important dates. |
| Scaling | NumExecutorsAdded | Management Module(s) | number of executors added in between the metric collection cycle |
| | NumExecutorsAddedReactive | Auto-Scaling Module(s) | number of executors recommended to be added in between the metric collection cycle by using reactive scaling. |

Figure 5:
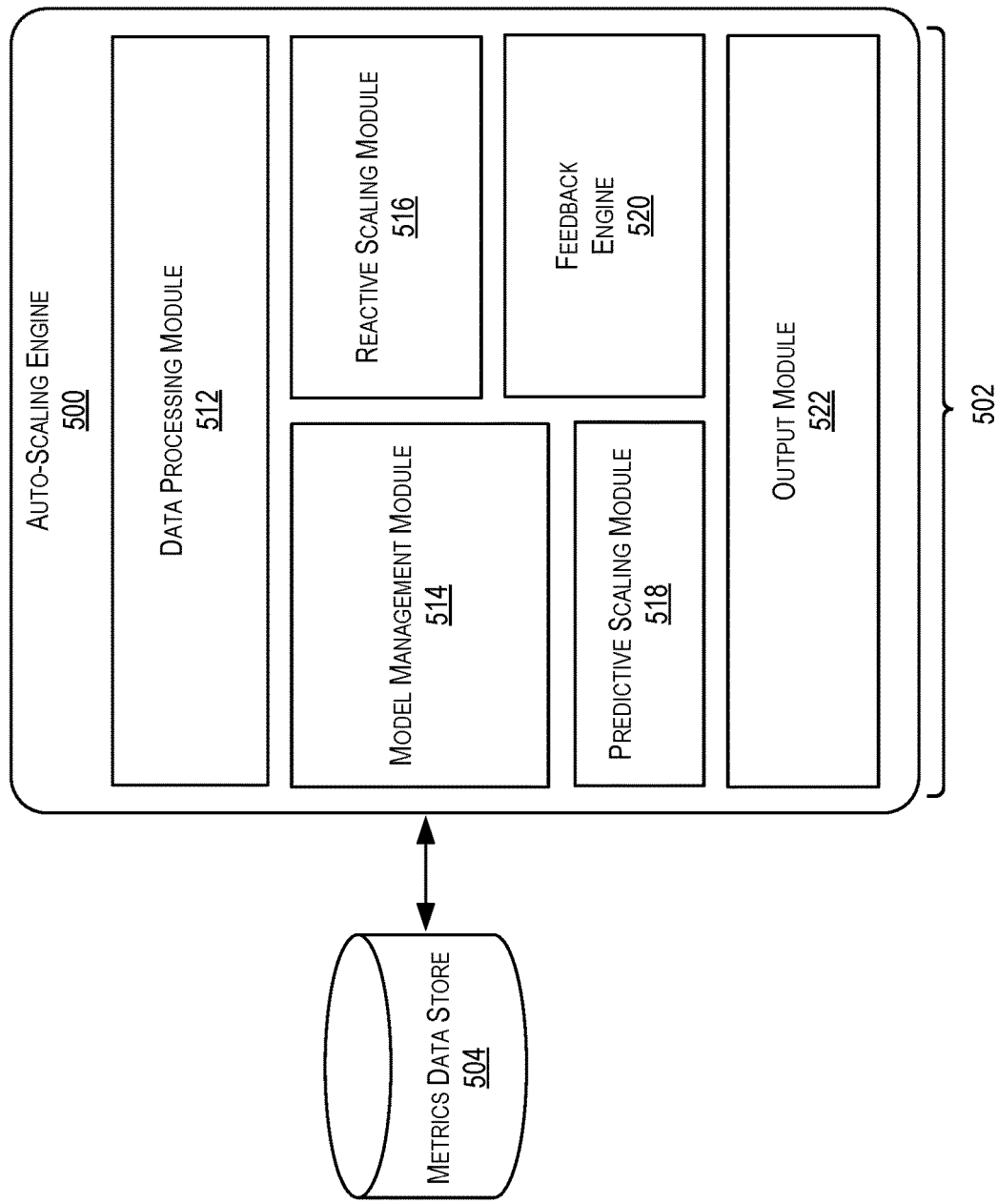
FIG. 5 is a schematic diagram of an example computer architecture for an auto-scaling engine, including a plurality of modules that may perform functions in accordance with at least one embodiment.

FIG. 5 is a schematic diagram of an example computer architecture for an auto-scaling engine 500 (e.g., the auto-scaling engine 474 of FIG. 4), including a plurality of modules 502 that may perform functions in accordance with at least one embodiment. The modules 502 may be software modules, hardware modules, or a combination thereof. If the modules 502 are software modules, the modules 502 can be embodied on a computer readable medium and processed by a processor in any of the computer systems described herein. It should be noted that any module or data store described herein, may be, in some embodiments, be a service responsible for managing data of the type required to make corresponding calculations. The modules 502 may be exist as part of the management node(s) 410 (or a separate computing resource) operating within the distributed system 406 of FIG. 4, or the modules may exist as separate modules or services external to the distributed system 406.

In the embodiment shown in the FIG. 5, metrics data store 504 (e.g., an example of the metrics data store 490 of FIG. 4) is shown, although content data can be maintained, derived, or otherwise accessed from various data stores, either remote or local to auto-scaling engine 500, to achieve the functions described herein. In at least one embodiment, the data stores described herein may operate as part of the distributed system 406 or may be physically distinct from the distributed system 406. Auto-scaling engine 500, as shown in FIG. 5, includes various modules such as a data processing module 512, a model management module 514, a reactive scaling module 516, a predictive scaling module 518, a feedback engine 520, and an output module 522. Some functions of the modules 502 are described below. However, for the benefit of the reader, a brief, non-limiting description of each of the modules is provided in the following paragraphs.

In at least one embodiment, auto-scaling engine 500 includes the data processing module 512. Generally, the data processing module 512 may be utilized to receive any suitable information with respect to any example provided herein. The data processing module 512 may include any suitable number of application programming interfaces with which the functionality of auto-scaling engine 500 may be invoked.

In some embodiments, the data processing module 512 may be configured to monitor one or more performance metrics of computing resources (e.g., computing devices, virtual machines, etc.) of a distributed system (e.g., the distributed system 406). The data processing module 512 may obtain one or more performance metrics from the metrics data store 504, a data store configured to store such information. The one or more performance metrics may have been originally provided by the management module 472 and/or the executor module 478 of FIG. 4. The data processing module 512 may be configured with any suitable number of performance thresholds that define performance requirements. By way of example, the data processing module 512 may be configured with a predefined latency threshold that indicates an amount of time (e.g., corresponding to every query, on average, etc.) by which queries are to be completed. The data processing module 512 may be configured to determine when the distributed system 406 is failing to meet a performance threshold. For example, the data processing module 512 can determine when the average complete time for queries (e.g., avgCompletionTime listed in the table above) has exceeded a predefined threshold (e.g., a predefined latency threshold). As another non-limiting example, the data processing module 512 may be configured to determine if there are idle executors (a condition that constitutes a performance degradation) based at least in part on determining a number of executors (e.g., numExecutors), a number of pending tasks (e.g., PendingTasks, tasks that are waiting for execution), and a number of active tasks (e.g., Active Tasks). If the number of pending tasks is zero and the number of executors exceeds the number of active tasks, then at least one executor may be considered idle. The data processing module 512 may be configured to invoke functionality of any other module of the modules 502 upon detecting a performance degradation or at any suitable time.

In some embodiments, the model management module 514 may be configured to train a model (e.g., the machine-learning model 202 of FIG. 2) to predict performance changes in a computing cluster. In at least one embodiments, output provided by the model may identify (and/or be used to identify) a total number and/or an additional number of worker node(s) that will be needed at some time in the future (e.g., 10 minutes in the future, 15 minutes in the future, etc.). The model management module 814 may obtain training data from the metrics data store 504 (a data store configured to store one or more performance metrics and/or cluster metadata provided by the management node(s) 410 and/or the worker node(s) 412 of FIG. 4). In some embodiments, the training data (e.g., training data set 204 of FIG. 2) may be previously stored in metrics data store 504, or auto-scaling engine 500 may receive (e.g., by the data processing module 512) the training data set from any suitable source and store the training data set in metrics data store 504 for subsequent use. The model management module 514 may be configured to train and/or retrain the machine-learning models discussed above utilizing the training set and any suitable supervised, unsupervised, or semi-supervised learning algorithm. For example, the model management module 514 may be configured to execute the operations discussed above in connection with FIG. 2 regarding training/retraining the machine-learning model 202, maintaining training data set 204 and/or adding to training data set 204. Once the model management module 514 has trained the machine-learning model, the model may be utilized to determine cluster adjustments based at least in part on subsequent performance metrics/cluster metadata provided as input.

In some embodiments, the reactive scaling module 516 may be configured with a rule set that defines any suitable number of conditions, whereby detecting a predefined condition causes the reactive scaling module 516 to adjust a number of computing nodes (e.g., a quantity of the worker node(s) 412) upward or downward depending on the action defined in the rule set. By way of example, the reactive scaling metric may detect that one or more worker nodes are idle and, in accordance with at least one rule of the rule set, the reactive scaling metric may determine a quantity/identity of nodes that are to be removed from the computing cluster (e.g., the distributed system 406). In some embodiments, the reactive scaling module 516 may be configured to instruct the output module 522 to perform operations to add and/or remove a number of worker nodes (and/or particular worker nodes) from the computing cluster.

In some embodiments, the predictive scaling module 518 may be configured to utilize the model trained by the model management module 514 to predict a number of computing nodes that are predicted to be needed at some time in the future (e.g., 15 minutes from the current time). The predictive scaling module 518 may obtain one or more performance metrics from the metrics data store 504 (e.g., the last metric collected/received by the metrics data store 504, metrics collected/received within a period of time such as a period of time spanning the last x minutes). Once obtained, the metrics may be provided by the predictive scaling module 518 to the machine-learning model 202 to produce an output (e.g., the output 206 of FIG. 2). In some embodiments, the output may indicate a number of computing nodes to be added/removed from the cluster and/or the output may indicate a total number of computing nodes needed at a future time (from which a number of computing nodes to be added/removed may be derived). In some embodiments, the predictive scaling module 518 may be configured to instruct the output module 522 to perform operations to add and/or remove a number of worker nodes (and/or particular worker nodes) from the computing cluster.

The feedback engine 520 may be configured to generate feedback data. The feedback engine 520 may determine whether adjusting the computing cluster (e.g., in accordance with a rule of the rule set enforced by the reactive scaling module 516 and/or in accordance with output provided by the machine-learning model) rectified the previously detected performance degradation. As a simplistic example, the feedback engine 520 may be configured to determine that a performance degradation occurred (e.g., a number of idle computing nodes were detected), a number of computing nodes were removed from the cluster in accordance with either the rule set utilized by the reactive scaling module 516 and/or output provided by the machine-learning model as obtained by the predictive scaling module 518, The feedback engine 520 may be configured to collect performance metrics that were provided within a predefined time period starting before the adjustment was made and including the time during which the adjustment to the computing cluster was made. The feedback engine 520 may be configured to label the metrics as either corresponding to an adjustment that rectified the performance degradation (e.g., a specific performance degradation) or did not rectify the performance degradation. The feedback engine 520 may store the labeled metrics as an additional instance of training data within the metrics data store. The additional instance of training data may be utilized by the model management module 514 at a subsequent time to retrain or update the machine-learning model. The feedback engine 520 generally may perform any suitable operations corresponding to the feedback procedure 208 discussed in connection with FIG. 2

According to some embodiments, the output module 522 performs any suitable operations for adjusting a number of computing nodes of a computing cluster (e.g., the distributed system 406). By way of example, the output module 522 may spawn a computing process (referred to as a "scaling task") that may execute any suitable operations for provisioning a new computing node to the computing cluster or removing a previously-provisioned computing node from the computing cluster.

Figure 6:
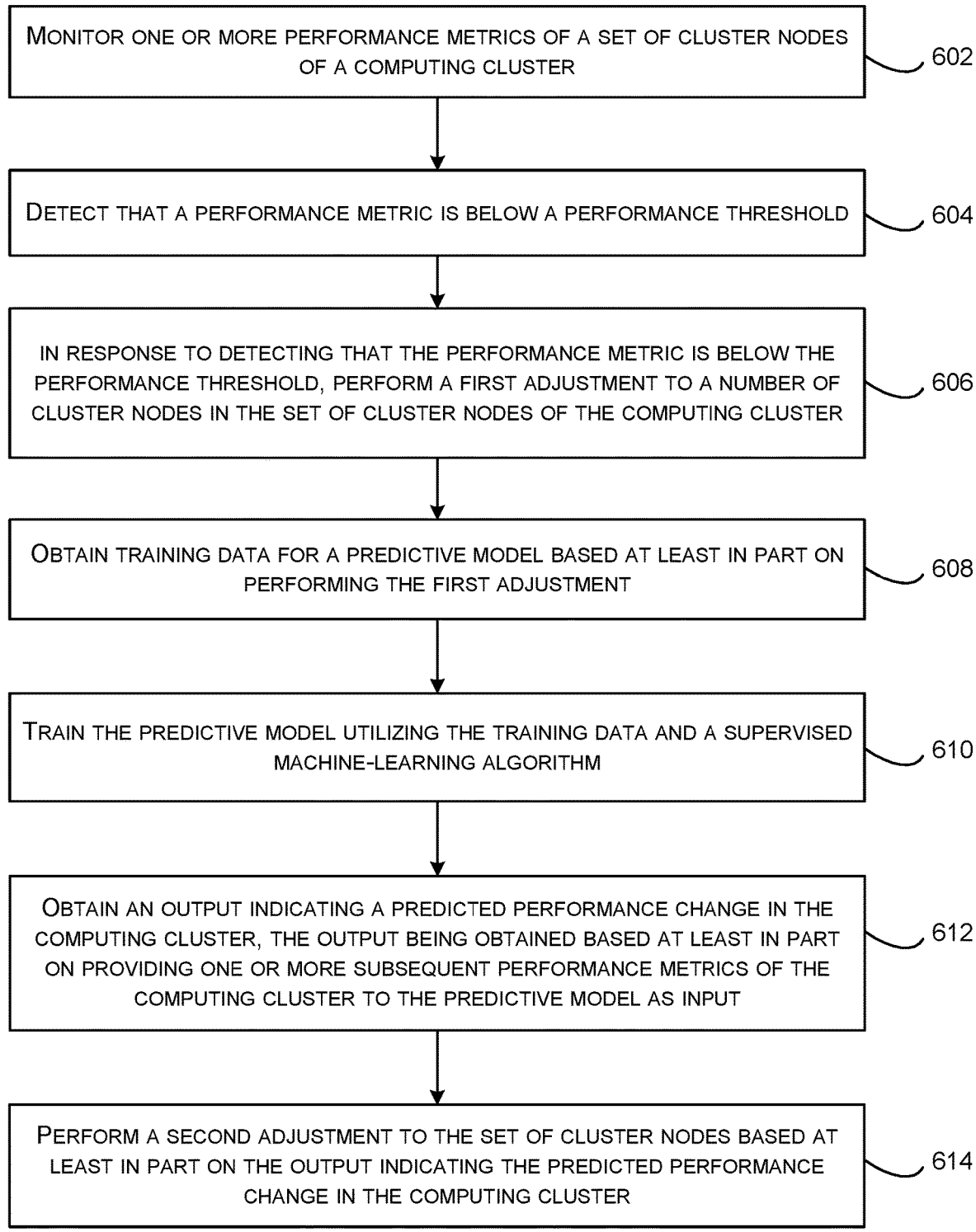
FIG. 6 depicts a flowchart illustrating an example of a method for adjusting the number of nodes of a computing cluster based at least in part on actual and/or predicted changes in performance of the computing cluster, in accordance with at least one embodiment.

FIG. 6 depicts a flowchart illustrating an example of a method 600 for adjusting the number of nodes of a computing cluster based at least in part on actual and/or predicted changes in performance of the computing cluster, in accordance with at least one embodiment. In some embodiments, the operations of method 600 may be performed by the auto-scaling engine 500 of FIG. 5 operating as a computing service or executing on a computing device within the distributed system 406 of FIG. 4, or as a device and/or service different from the distributed system 406 with access to the performance metrics of the distributed system 406.

The method 600 may begin at block 602, where one or more performance metrics of a set of worker nodes of a computing cluster may be monitored (e.g., by the data processing module 512 of FIG. 5). The monitoring may include obtaining the one or more performance metrics according to any suitable predefined schedule, periodicity, frequency, based at least in part on changes to the performance metrics, or the like.

At 604, the auto-scaling engine 500 (or a component of the auto-scaling service such as the data processing module 512) may detect a performance degradation of the computing cluster (e.g., that a performance metric is below a performance threshold). The auto-scaling engine may be configured with any suitable thresholds (e.g., ranges, lower limits, upper limits, allowable values, etc.) corresponding with any suitable performance metric (or combination of performance metrics).

At 606, in response to detecting that the performance metric is below the performance threshold, the auto-scaling engine 500 performs a first adjustment to a number of worker nodes in the set of worker nodes of the computing cluster. By way of example, the reactive scaling module 516 may identify the first adjustment (e.g., a number by which the set of worker nodes is to be increased/decreased) according to a predefined rule set. The reactive scaling module 516 may then instruct the output module 522 to perform any suitable operations for executing the first adjustment to the set of worker nodes of the computing cluster.

At 608, the auto-scaling engine 500 obtains training data for a machine-learning model (e.g., the machine-learning model 202) based at least in part on performing the first adjustment. By way of example, the feedback engine 520 may be utilized to collect performance metrics applicable to the first adjustment (e.g., performance metrics before, during, and/or after the first adjustment) and determine whether the first adjustment rectified the performance degradation. The feedback engine 520 may label the performance metrics with its determination and provide the collective data as an instance of training data with which the machine-learning model may be retrained/updated.

At 610, the machine-learning model may be trained (e.g., by the model management module 514) utilizing the training data and a supervised machine-learning algorithm.

At 612, the auto-scaling engine 500 (e.g., or a component of the auto-scaling engine 500 such as the predictive scaling module 518) may obtain an output indicating a predicted performance change in the computing cluster. In some embodiments, the output is obtained based at least in part on providing one or more subsequent performance metrics of the computing cluster to the machine-learning model as input. The one or more subsequent performance metrics may be received by the data processing module 512 and passed to the predictive scaling module 518, or the predictive scaling module 518 may retrieve said metrics from the metrics data store 504 of FIG. 5.

At 614, the auto-scaling engine 500 may perform a second adjustment to the set of worker nodes based at least in part on the output indicating the predicted performance change in the computing cluster. By way of example, the predictive scaling module 518 may identify the second adjustment (e.g., a number by which the set of worker nodes is to be increased/decreased) according to the output provided by the model. In some embodiments, the output indicates a total number of computing nodes needed and/or a number by which the computing nodes are to be increased or decreased. The predictive scaling module 518 then instructs the output module 522 to perform any suitable operations for executing the first adjustment to the set of worker nodes of the computing cluster.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
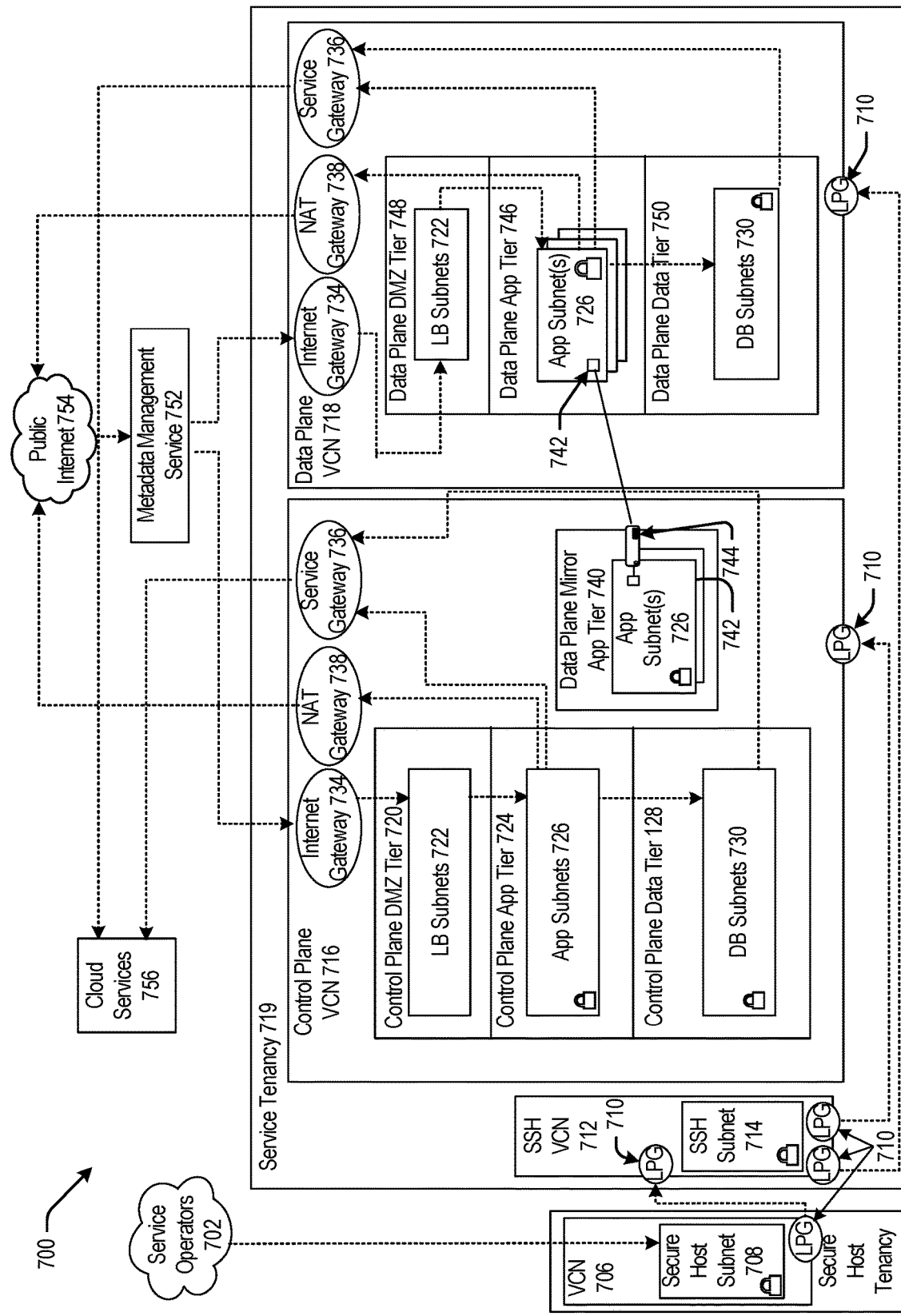
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep security breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of security, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
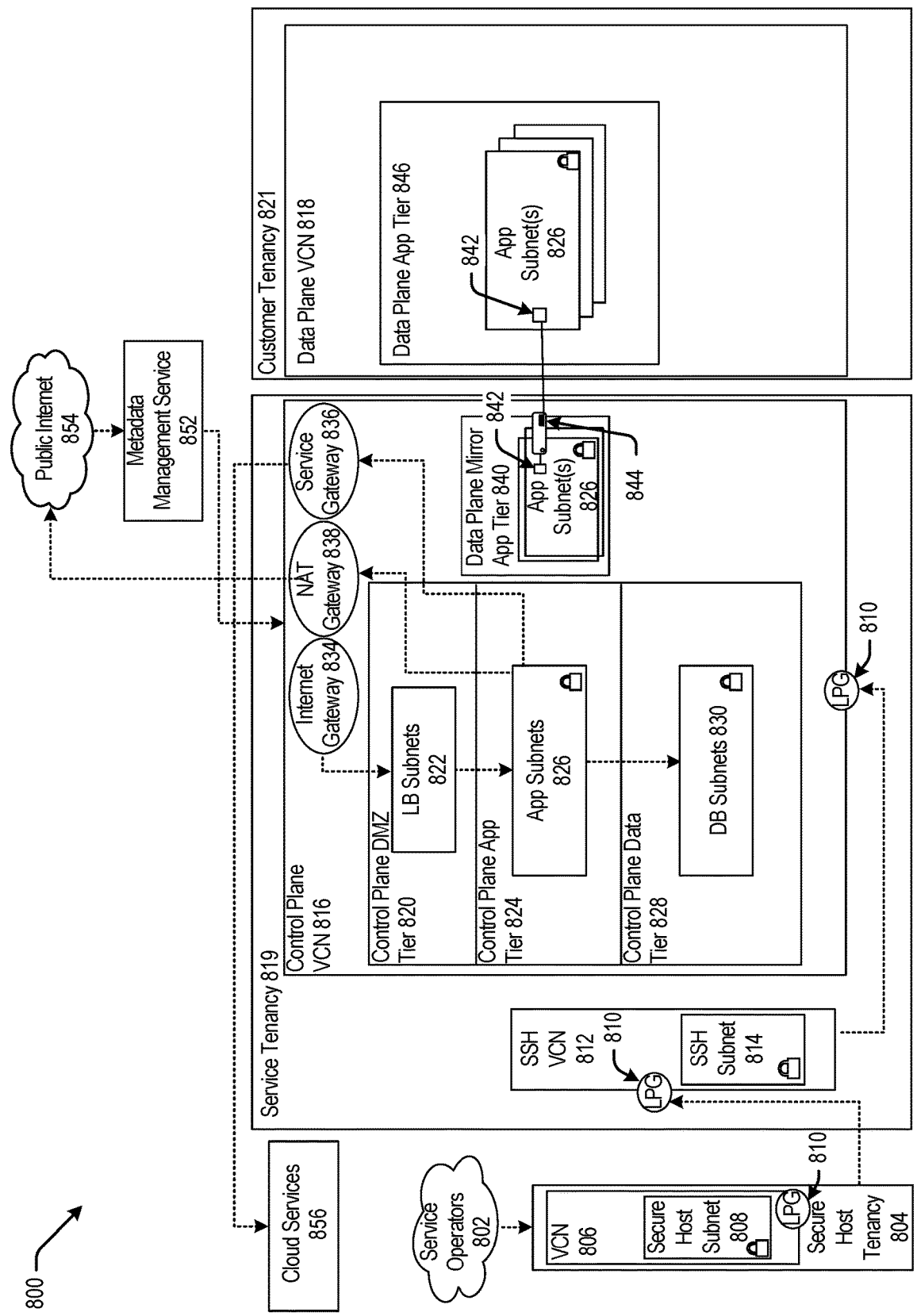
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
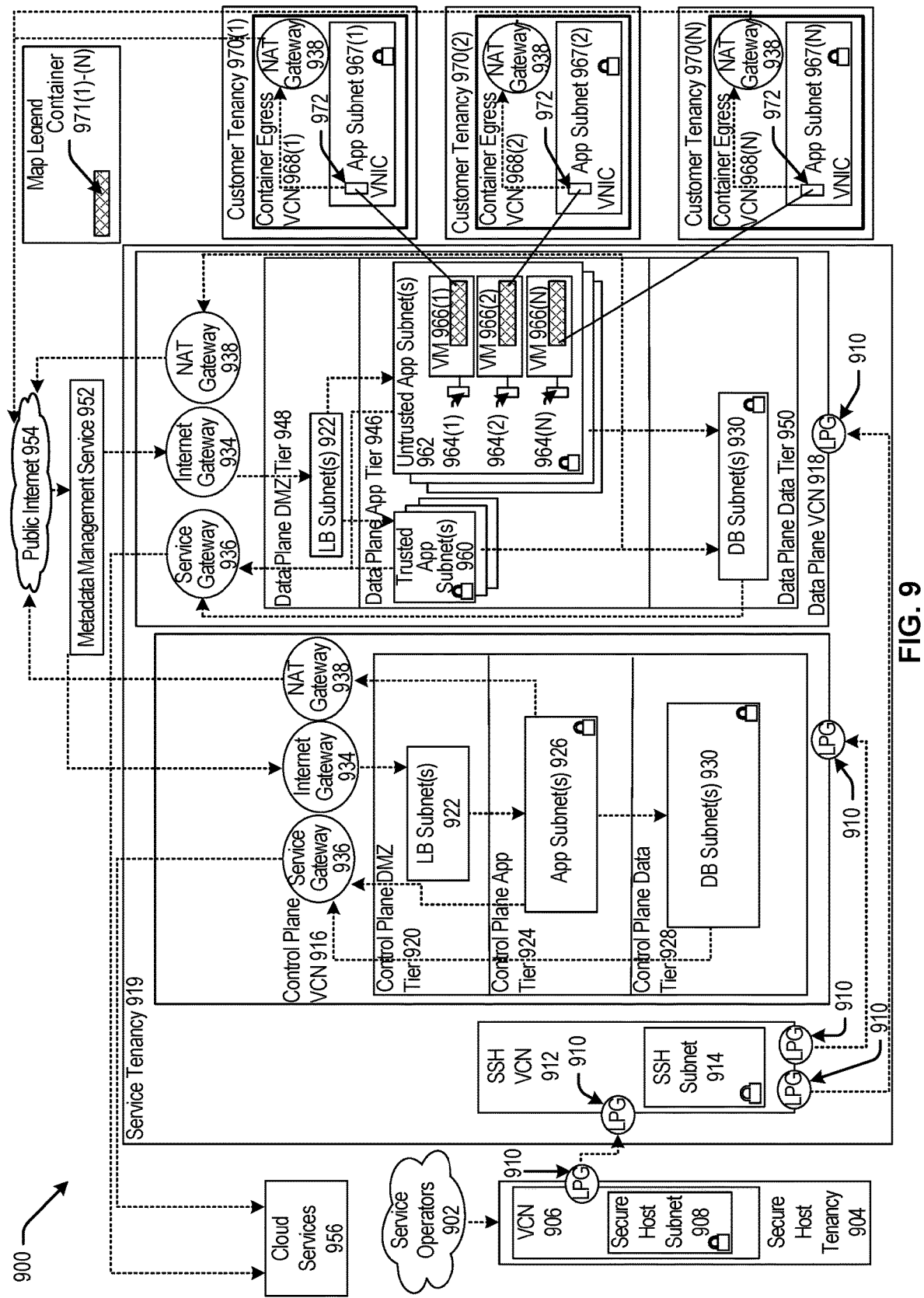
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
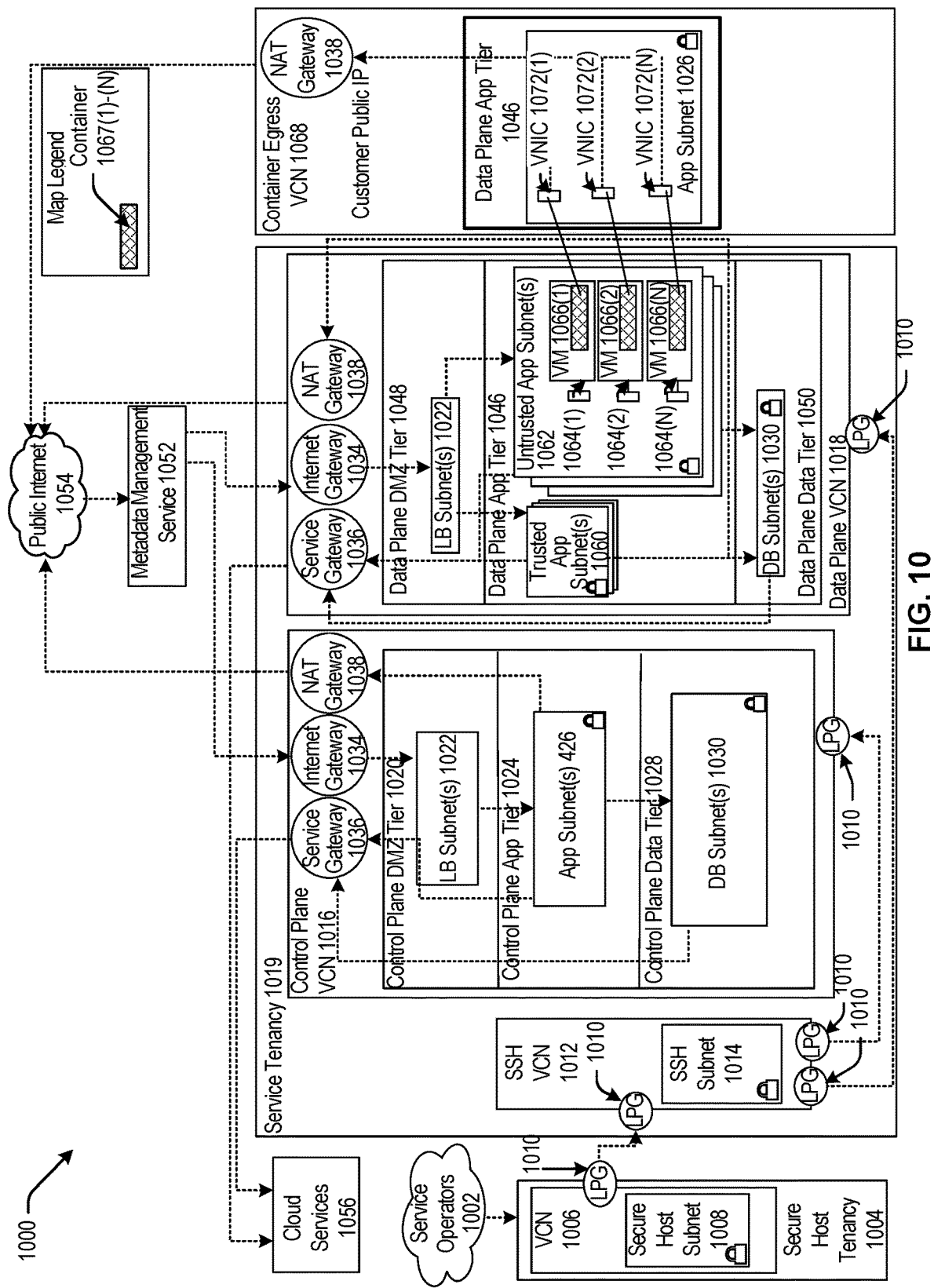
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
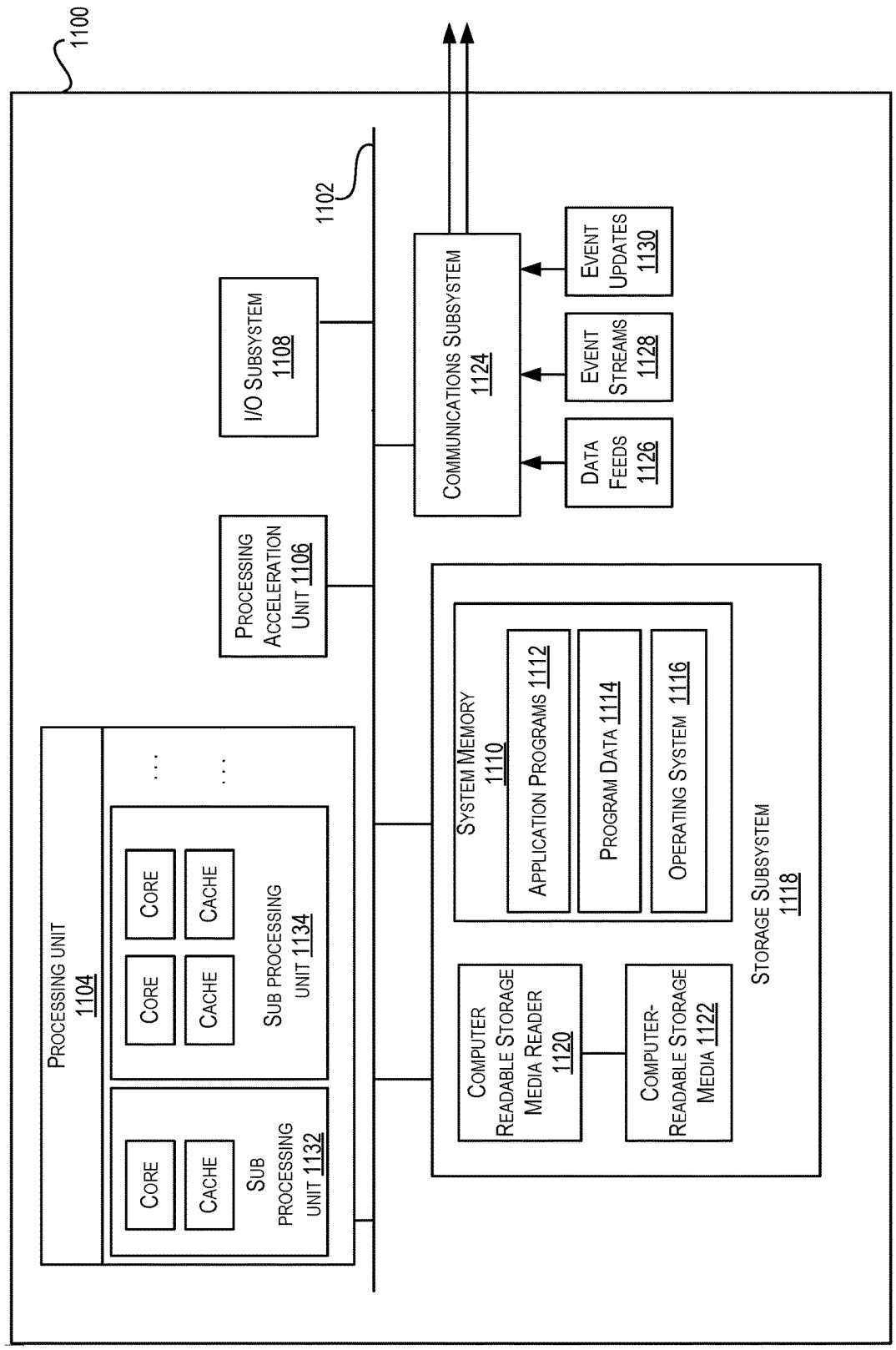
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
monitoring, by a computing service, one or more performance metrics of a set of worker nodes of a computing cluster;
detecting, by the computing service, a performance degradation that indicates a performance metric is below a performance threshold;
in response to detecting that the performance metric is below the performance threshold, performing, by the computing service, a first adjustment to a number of worker nodes in the set of worker nodes of the computing cluster;
obtaining, by the computing service, a training data example for a machine-learning model based at least in part on performing the first adjustment, the training data example comprising data corresponding to a first time period prior to the first adjustment and a second time period following the first adjustment, the training data example comprising first performance metrics and first cluster metadata associated with the first time period and second performance metrics and second cluster metadata associated with the second time period;
labeling the training data example based at least in part on determining that the first adjustment to the number of worker nodes rectified the performance degradation, the determining being based at least in part on the first performance metrics and the first cluster metadata associated with the first time period and the second performance metrics and the second cluster metadata associated with the second time period;
training, by the computing service, the machine-learning model utilizing the training data example and a supervised machine-learning algorithm, the machine-learning model being trained to identify a particular adjustment to the set of worker nodes from current performance metrics and current cluster metadata provided as input;
obtaining, by the computing service, an output identifying a subsequent adjustment to be made to the set of worker nodes, the subsequent adjustment indicating one or more worker nodes are to be added or removed from the set of worker nodes, the output being obtained based at least in part on providing subsequent performance metrics and subsequent cluster metadata of the computing cluster to the machine-learning model as input; and
performing, by the computing service, the subsequent adjustment to the set of worker nodes based at least in part on the output.

2. The computer-implemented method of claim 1, wherein adjusting the set of worker nodes further comprises generating, by the computing service, a scaling task, wherein the scaling task is executed by a computing process, wherein executing the computing process updates the current cluster metadata associated with the computing cluster upon completion of the scaling task.

3. The computer-implemented method of claim 1, wherein the output indicates how many worker nodes are to be added or removed from the computing cluster, the subsequent adjustment occurring within a predefined period of time in the future.

4. The computer-implemented method of claim 1, wherein performing the first adjustment or performing the subsequent adjustment comprises increasing a quantity of the set of worker nodes or decreasing the quantity of the set of worker nodes.

5. The computer-implemented method of claim 1, wherein performing the first adjustment comprises provisioning a number of additional worker nodes to the set of worker nodes of the computing cluster.

6. The computer-implemented method of claim 5, further comprising determining that provisioning the number of additional worker nodes has resulted in a subsequent performance metric that exceeds the performance threshold, wherein the training data example is generated in response to determining the number of additional worker nodes has resulted in the subsequent performance metric.

7. The computer-implemented method of claim 1, wherein the one or more performance metrics comprise at least one of: a number of pending queries, a number of pending tasks, a latency measurement, processing utilization, or memory utilization.

8. The computer-implemented method of claim 1, further comprising:
in response to detecting that the performance metric is below the performance threshold, performing, by the computing service, a second adjustment to the number of worker nodes in the set of worker nodes of the computing cluster, the second adjustment being performed prior to the first adjustment, the second adjustment being similar to the first adjustment;
determining that performing the second adjustment has caused performance of the computing cluster to approach the performance threshold, wherein the first adjustment is performed further based at least in part on determining that the second adjustment has caused performance of the computing cluster to approach the performance threshold.

9. The computer-implemented method of claim 1, further comprising:
in response to detecting that the performance metric is below the performance threshold, performing, by the computing service, a second adjustment to the number of worker nodes in the set of worker nodes of the computing cluster, the second adjustment being performed prior to the first adjustment, the second adjustment dissimilar to the first adjustment; and
determining that performing the second adjustment has caused performance of the computing cluster to worsen, wherein the first adjustment is performed further based at least in part on determining that the second adjustment has caused performance of the computing cluster to worsen.

10. The computer-implemented method of claim 1, wherein the training data example further comprises additional performance metrics and additional cluster metadata corresponding to the subsequent adjustment.

11. A computing device, comprising:
one or more processing devices communicatively coupled to a computer-readable medium; and
a computer-readable medium storing non-transitory computer-executable program instructions that, when executed by the one or more processing devices, causes the computing device to perform operations comprising:
monitoring performance metrics of a set of worker nodes of a computing cluster;
detecting a performance degradation that indicates a performance metric is below a performance threshold;
in response to detecting that the performance metric is below the performance threshold, performing a first adjustment to a number of worker nodes in the set of worker nodes of the computing cluster;
obtaining a training data example for a machine-learning model based at least in part on performing the first adjustment, the training data example comprising data corresponding to a first time period prior to the first adjustment and a second time period following the first adjustment, the training data example comprising first performance metrics and first cluster metadata associated with the first time period and second performance metrics and second cluster metadata associated with the second time period;
labeling the training data example based at least in part on determining that the first adjustment to the number of worker nodes rectified the performance degradation, the determining being based at least in part on the first performance metrics and the first cluster metadata associated with the first time period and the second performance metrics and the second cluster metadata associated with the second time period;
training the machine-learning model utilizing the training data example and a supervised machine-learning algorithm, the machine-learning model being trained to identify a particular adjustment to the set of worker nodes from current performance metrics and current cluster metadata provided as input;
obtaining an output identifying a subsequent adjustment to be made to the set of worker nodes, the subsequent adjustment indicating one or more worker nodes are to be added or removed from the set of worker nodes, the output being obtained based at least in part on providing subsequent performance metrics and subsequent cluster metadata of the computing cluster to the machine-learning model as input; and
performing the subsequent adjustment to the set of worker nodes based at least in part on the output.

12. The computing device of claim 11, wherein adjusting the set of worker nodes further comprises generating, by the computing device, a scaling task, wherein the scaling task is executed by a computing process, wherein executing the computing process updates the current cluster metadata associated with the computing cluster upon completion of the scaling task.

13. The computing device of claim 12, wherein the output indicates how many worker nodes are to be added or removed from the computing cluster, the subsequent adjustment occurring within a predefined period of time in the future.

14. The computing device of claim 11, wherein performing the first adjustment or performing the subsequent adjustment comprises increasing a quantity of the set of worker nodes or decreasing the quantity of the set of worker nodes.

15. The computing device of claim 11, wherein performing the first adjustment comprises provisioning a number of additional worker nodes to the set of worker nodes of the computing cluster, and wherein the computing device performs additional operations comprising determining that provisioning the number of additional worker nodes has resulted in a subsequent performance metric that exceeds the performance threshold, wherein the training data example is generated in response to determining the number of additional worker nodes has resulted in the subsequent performance metric.

16. A non-transitory computer-readable storage medium storing computer-executable program instructions that, when executed by a processing device of a computing device, cause the computing device to perform operations comprising:

monitoring performance metrics of a set of worker nodes of a computing cluster;

detecting a performance degradation that indicates a performance metric is below a performance threshold;

in response to detecting that the performance metric is below the performance threshold, performing a first adjustment to a number of worker nodes in the set of worker nodes of the computing cluster;

obtaining a training data example for a machine-learning model based at least in part on performing the first adjustment, the training data example comprising data corresponding to a first time period prior to the first adjustment and a second time period following the first adjustment, the training data example comprising first performance metrics and first cluster metadata associated with the first time period and second performance metrics and second cluster metadata associated with the second time period;

labeling the training data example based at least in part on determining that the first adjustment to the number of worker nodes rectified the performance degradation, the determining being based at least in part on the first performance metrics and the first cluster metadata associated with the first time period and the second performance metrics and the second cluster metadata associated with the second time period;

training the machine-learning model utilizing the training data example and a supervised machine-learning algorithm, the machine-learning model being trained to identify a particular adjustment to the set of worker nodes from current performance metrics and current cluster metadata provided as input;

obtaining an output identifying a subsequent adjustment to be made to the set of worker nodes, the subsequent adjustment indicating one or more worker nodes are to be added or removed from the set of worker nodes, the output being obtained based at least in part on providing subsequent performance metrics and subsequent cluster metadata of the computing cluster to the machine-learning model as input; and performing the subsequent adjustment to the set of worker nodes based at least in part on the output.

17. The non-transitory computer-readable storage medium of claim 16, wherein adjusting the set of worker nodes further comprises generating, by the computing device, a scaling task, wherein the scaling task is executed by a computing process, wherein executing the computing process updates the current cluster metadata associated with the computing cluster upon completion of the scaling task.

18. The non-transitory computer-readable storage medium of claim 17, wherein the output indicates how many worker nodes are to be added or removed from the computing cluster, the subsequent adjustment occurring within a predefined period of in the future.

19. The non-transitory computer-readable storage medium of claim 16, wherein performing the first adjustment or performing the subsequent adjustment comprises increasing a quantity of the set of worker nodes or decreasing the quantity of the set of worker nodes.

20. The non-transitory computer-readable storage medium of claim 16, wherein performing the first adjustment comprises provisioning a number of additional worker nodes to the set of worker nodes of the computing cluster, and wherein the computing device performs additional operations comprising determining that provisioning the number of additional worker nodes has resulted in a subsequent performance metric that exceeds the performance threshold, wherein the training data example is generated in response to determining the number of additional worker nodes has resulted in the subsequent performance metric.

* * * * *

UNITED STATES PATENT AND TRADEMARK OFFICE
CERTIFICATE OF CORRECTION

PATENT NO. : 11,609,794 B2
APPLICATION NO. : 17/094715
DATED : March 21, 2023
INVENTOR(S) : Akinapelli et al.

It is certified that error appears in the above-identified patent and that said Letters Patent is hereby corrected as shown below:

In the Specification

In Column 3, Line 41, delete "embodiment;" and insert -- embodiment. --, therefor.

In Column 3, Line 44, delete "embodiment;" and insert -- embodiment. --, therefor.

In Column 3, Line 49, delete "embodiment;" and insert -- embodiment. --, therefor.

In Column 3, Line 53, delete "embodiment;" and insert -- embodiment. --, therefor.

In Column 7, Line 21, delete "requests)" and insert -- requests)) --, therefor.

In Column 8, Line 43, delete "metadata"))" and insert -- metadata") --, therefor.

In Column 11, Line 46, delete "degradationdegradation" and insert -- degradation --, therefor.

In Columns 19-20, Line 21, delete "CacheCapactity" and insert -- CacheCapacity --, therefor.

In Columns 19-20, Line 26, delete "CachePropogationTime" and insert -- CachePropagationTime --, therefor.

In Column 19-20, Line 34, delete "NumExecutosr WithCache" and insert -- NumExecutorWithCache --, therefor.

In Column 24, Line 65, delete "FIG. 2" and insert -- FIG. 2. --, therefor.

In Column 26, Line 63, delete "demand)" and insert -- demand)) --, therefor.

In Column 39, Line 41, delete "evolution)," and insert -- evolution)), --, therefor.

Signed and Sealed this
Second Day of January, 2024

Katherine Kelly Vidal
*Director of the United States Patent and Trademark Office*

CERTIFICATE OF CORRECTION (continued)
U.S. Pat. No. 11,609,794 B2

In the Claims

In Column 46, Line 21, in Claim 18, after "of" insert -- time --, therefor.